US012585270B2

(12) United States Patent
De Castro Paiva et al.

(10) Patent No.: US 12,585,270 B2
(45) Date of Patent: Mar. 24, 2026

(54) TRIPLEX FULLY REDUNDANT FLY-BY-WIRE ARCHITECTURE

(71) Applicant: EMBRAER S.A., São José dos Campos (BR)

(72) Inventors: Luiz Fernando Silva De Castro Paiva, São José dos Campos (BR); Norton Jody Murata, São José dos Campos (BR); Omar Mogames, São José dos Campos (BR); Rafael Desideri De Freitas, São José dos Campos (BR)

(73) Assignee: EMBRAER S.A., São José dos Campos—SP (BR)

( * ) Notice: Subject to any disclaimer, the term of this patent is extended or adjusted under 35 U.S.C. 154(b) by 767 days.

(21) Appl. No.: 17/719,079

(22) Filed: Apr. 12, 2022

(65) Prior Publication Data

US 2023/0322366 A1      Oct. 12, 2023

(51) Int. Cl.
| | |
|---|---|
| *B64C 13/50* | (2006.01) |
| *B64D 43/00* | (2006.01) |
| *G05D 1/00* | (2006.01) |
| *B64D 27/33* | (2024.01) |
| *B64D 27/34* | (2024.01) |

(52) U.S. Cl.
CPC ......... *G05D 1/0077* (2013.01); *B64C 13/503* (2013.01); *B64C 13/505* (2018.01); *B64D 43/00* (2013.01); *B64D 27/33* (2024.01); *B64D 27/34* (2024.01); *B64D 2221/00* (2013.01)

(58) Field of Classification Search
CPC . B64C 13/503; B64C 13/505; B64D 2221/00; B64D 27/24; B64D 31/06; B64D 43/00; G05D 1/0077; G05D 1/102
See application file for complete search history.

(56) References Cited

U.S. PATENT DOCUMENTS

| | | | |
|---|---|---|---|
| 11,099,936 B2 | 8/2021 | Galvao et al. | |
| 2009/0089641 A1* | 4/2009 | Schedelbeck | H04L 69/40 |
| | | | 714/748 |
| 2010/0084513 A1* | 4/2010 | Gariepy | G05D 1/0094 |
| | | | 244/190 |
| 2012/0008946 A1* | 1/2012 | Andriolli | H04J 14/0227 |
| | | | 398/49 |
| 2013/0311006 A1* | 11/2013 | Ahmad | G05D 1/0077 |
| | | | 701/3 |

(Continued)

OTHER PUBLICATIONS

Yeh, "Design Considerations in Boeing 777 Fly-By-Wire Computers", Proceedings Third IEEE International High-Assurance Systems Engineering Symposium (Cat. No.98EX231) (IEEE 1998).

(Continued)

*Primary Examiner* — Vivek D Koppikar
(74) *Attorney, Agent, or Firm* — Nixon & Vanderhye PC

(57) ABSTRACT

A first Flight Control system configuration, and the method to obtain such first configuration, has controllers of effector actuation able to receive commands directly from at least three Flight Control Computers (FCCs). A second Flight Control system configuration, and the method to obtain such second configuration, has retransmitters (RTX) that receive commands from the three FCCs and then retransmit to the controllers of effector actuation. A third Flight Control system configuration, and the method to obtain such third configuration, is a hybrid configuration.

23 Claims, 35 Drawing Sheets

System Architecture with RTX

(56)  References Cited

U.S. PATENT DOCUMENTS

| 2014/0100718 A1* | 4/2014 | Brot | B64C 19/00 |
| | | | 701/3 |
| 2021/0171187 A1 | 6/2021 | Keir | |

OTHER PUBLICATIONS

Balmus, "Aircraft Data Acquisition", Incas Bulletin, vol. 8, Issue 1/ 2016, pp. 141-151, ISSN 2066-8201; ARINC Specification 429, Part 1-17, Annapolis, Maryland: Aeronautical Radio, Inc. (May 17, 2004).
Extended European Search Report issued in EP Application No. 23167485.4 dated Jul. 20, 2023.

* cited by examiner

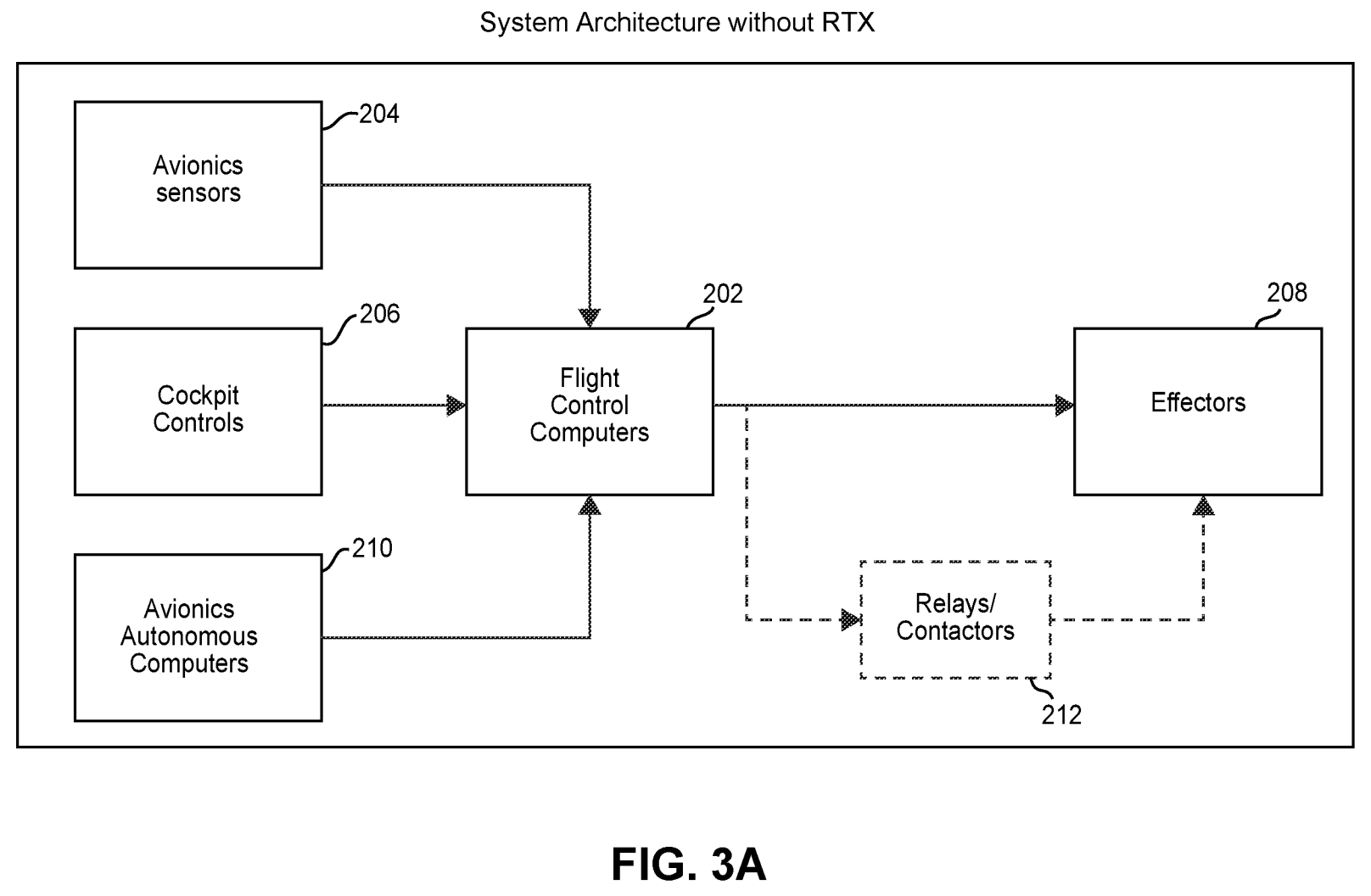

System Architecture without RTX

208

Effectors

212

Relays/
Contactors

202

Flight
Control
Computers

204

Avionics
sensors

206

Cockpit
Controls

210

Avionics
Autonomous
Computers

FIG. 3A

System Architecture with RTX

FIG. 3B

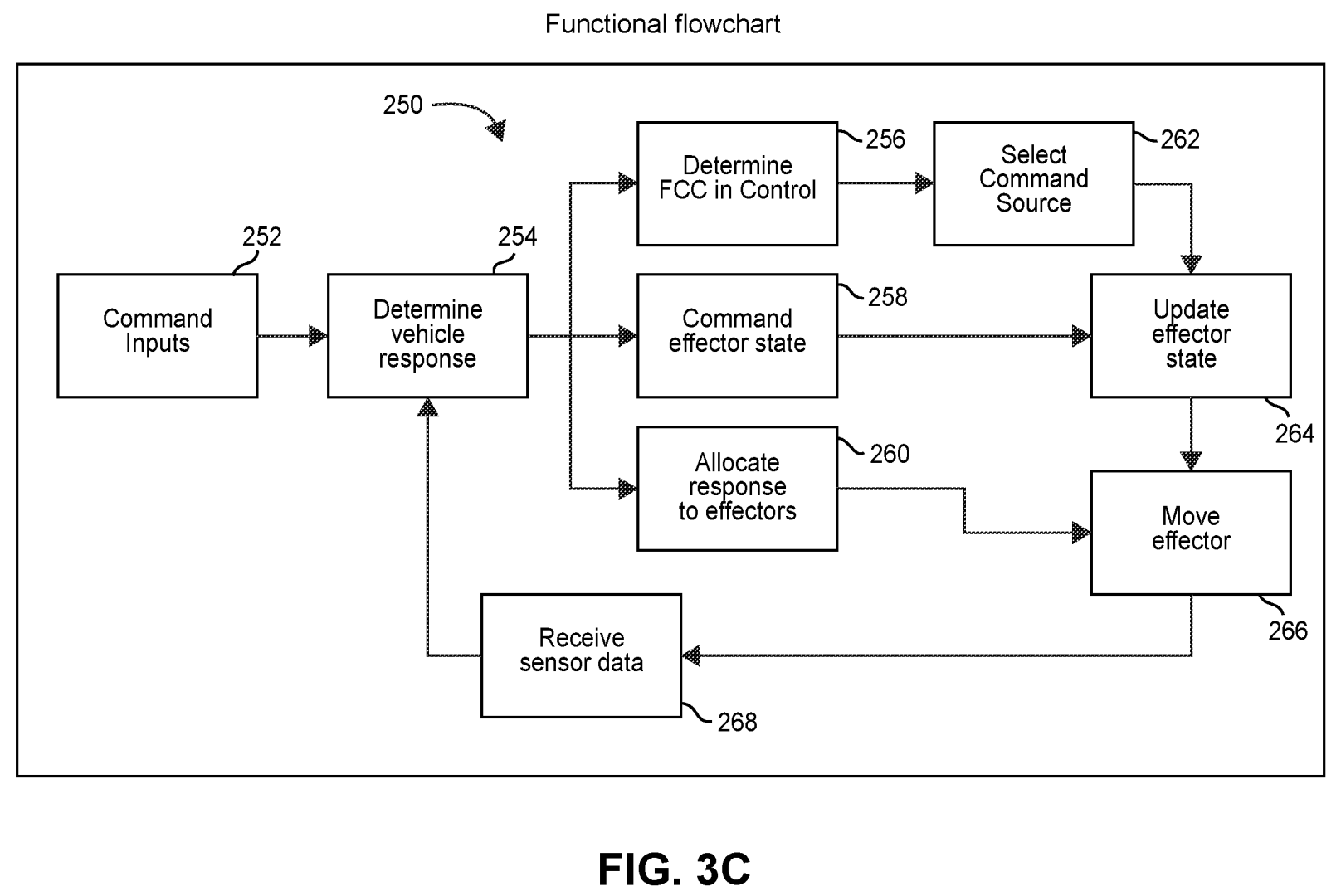

Functional flowchart

250

Command Inputs — 252

Determine vehicle response — 254

Determine FCC in Control — 256

Select Command Source — 262

Command effector state — 258

Allocate response to effectors — 260

Update effector state — 264

Move effector — 266

Receive sensor data — 268

FIG. 3C

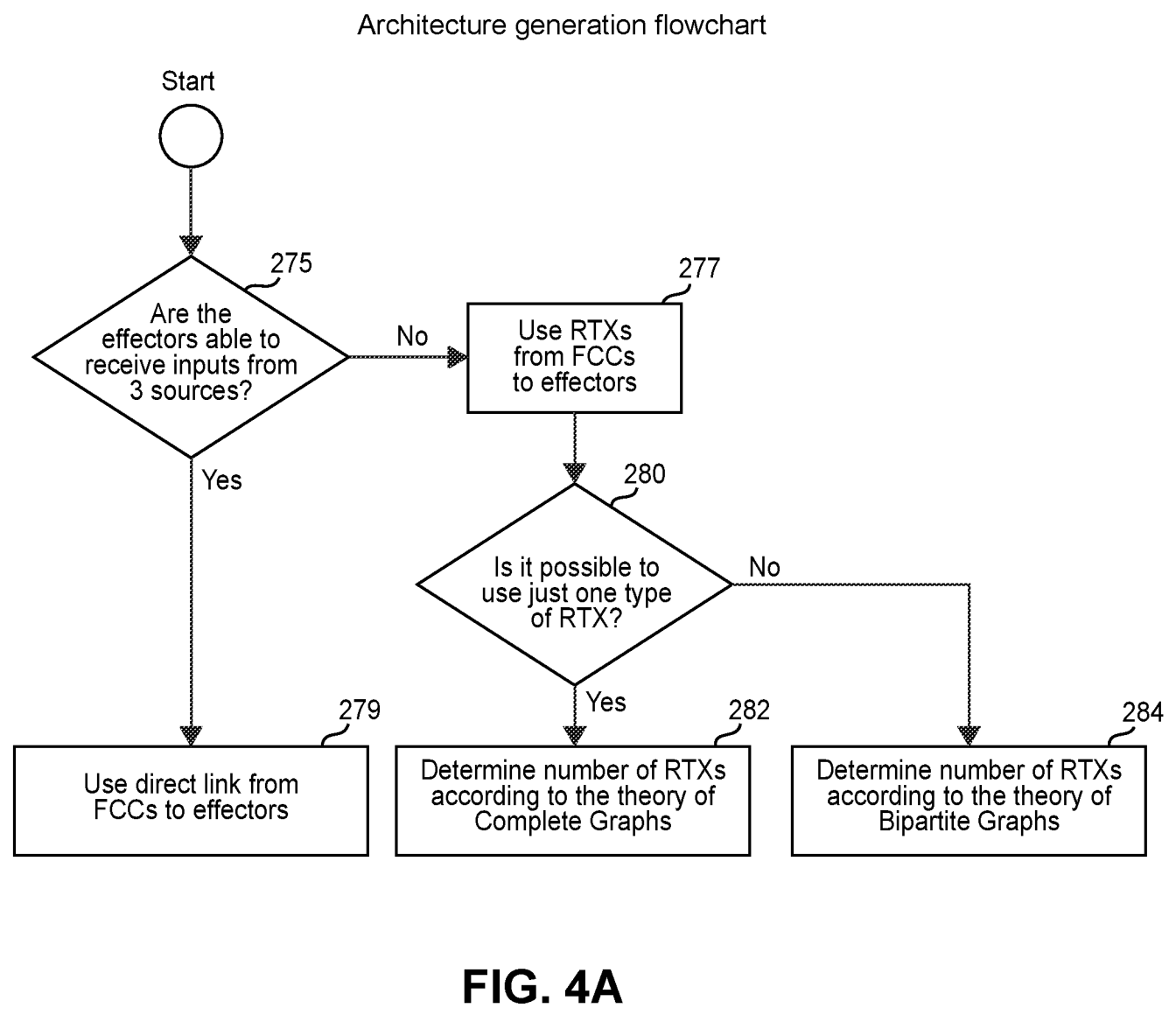

Architecture generation flowchart

Start

275
Are the effectors able to receive inputs from 3 sources?

Yes → 279 Use direct link from FCCs to effectors

No → 277 Use RTXs from FCCs to effectors

280
Is it possible to use just one type of RTX?

Yes → 282 Determine number of RTXs according to the theory of Complete Graphs

No → 284 Determine number of RTXs according to the theory of Bipartite Graphs

FIG. 4A

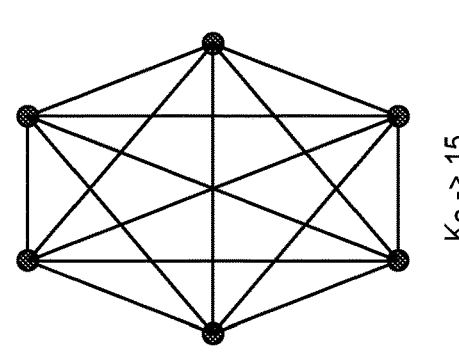
Exclusive grouping of two units according to the theory of Complete Graph
$K_7 \to 21$
$K_6 \to 15$
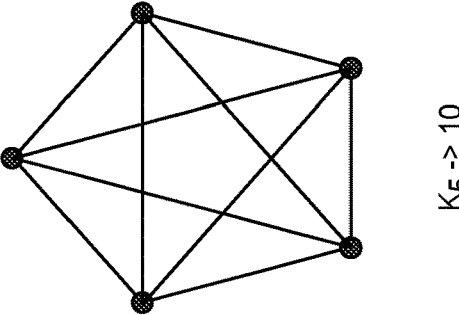
$K_5 \to 10$
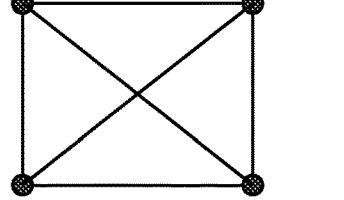
$K_4 \to 6$
FIG. 4B

Figure 6:
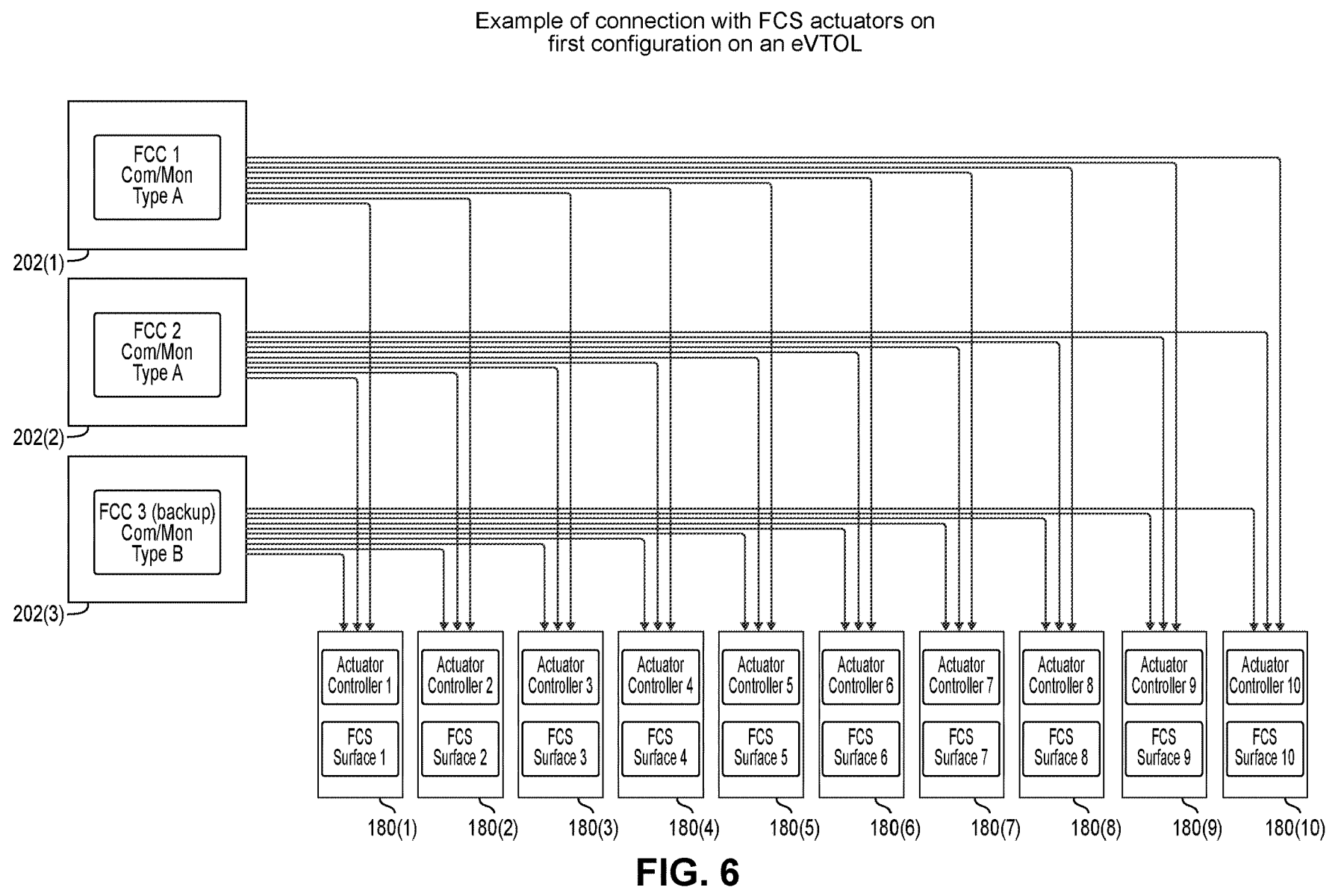

Example of connection with FCS actuators on
first configuration on an eVTOL

| | |
|---|---|
| Actuator Controller 10 | FCS Surface 10 |

180(10)

| | |
|---|---|
| Actuator Controller 9 | FCS Surface 9 |

180(9)

| | |
|---|---|
| Actuator Controller 8 | FCS Surface 8 |

180(8)

| | |
|---|---|
| Actuator Controller 7 | FCS Surface 7 |

180(7)

| | |
|---|---|
| Actuator Controller 6 | FCS Surface 6 |

180(6)

| | |
|---|---|
| Actuator Controller 5 | FCS Surface 5 |

180(5)

| | |
|---|---|
| Actuator Controller 4 | FCS Surface 4 |

180(4)

| | |
|---|---|
| Actuator Controller 3 | FCS Surface 3 |

180(3)

| | |
|---|---|
| Actuator Controller 2 | FCS Surface 2 |

180(2)

| | |
|---|---|
| Actuator Controller 1 | FCS Surface 1 |

180(1)

FCC 1
Com/Mon
Type A

202(1)

FCC 2
Com/Mon
Type A

202(2)

FCC 3 (backup)
Com/Mon
Type B

Example of connection with Motor Controllers
on second configuration on an eVTOL Example of connection with FCS Actuators on second branch of second configuration on an eVTOL Example of connection with Motor Controllers on second branch of second configuration on an eVTOL with twin motor controllers Example of connection with Motor Controllers on first
branch of second configuration on an eVTOL

FIG. 11

Example of connection with
Motor Controllers and
actuators on a hybrid
configuration on an eVTOL Example of connection with Motor Controllers on second branch
of second configuration on an eVTOL, with RTX performing FCC function Example of connection with FCS Actuators on second branch of
second configuration on an eVTOL, with RTX performing FCC function

FIG. 15

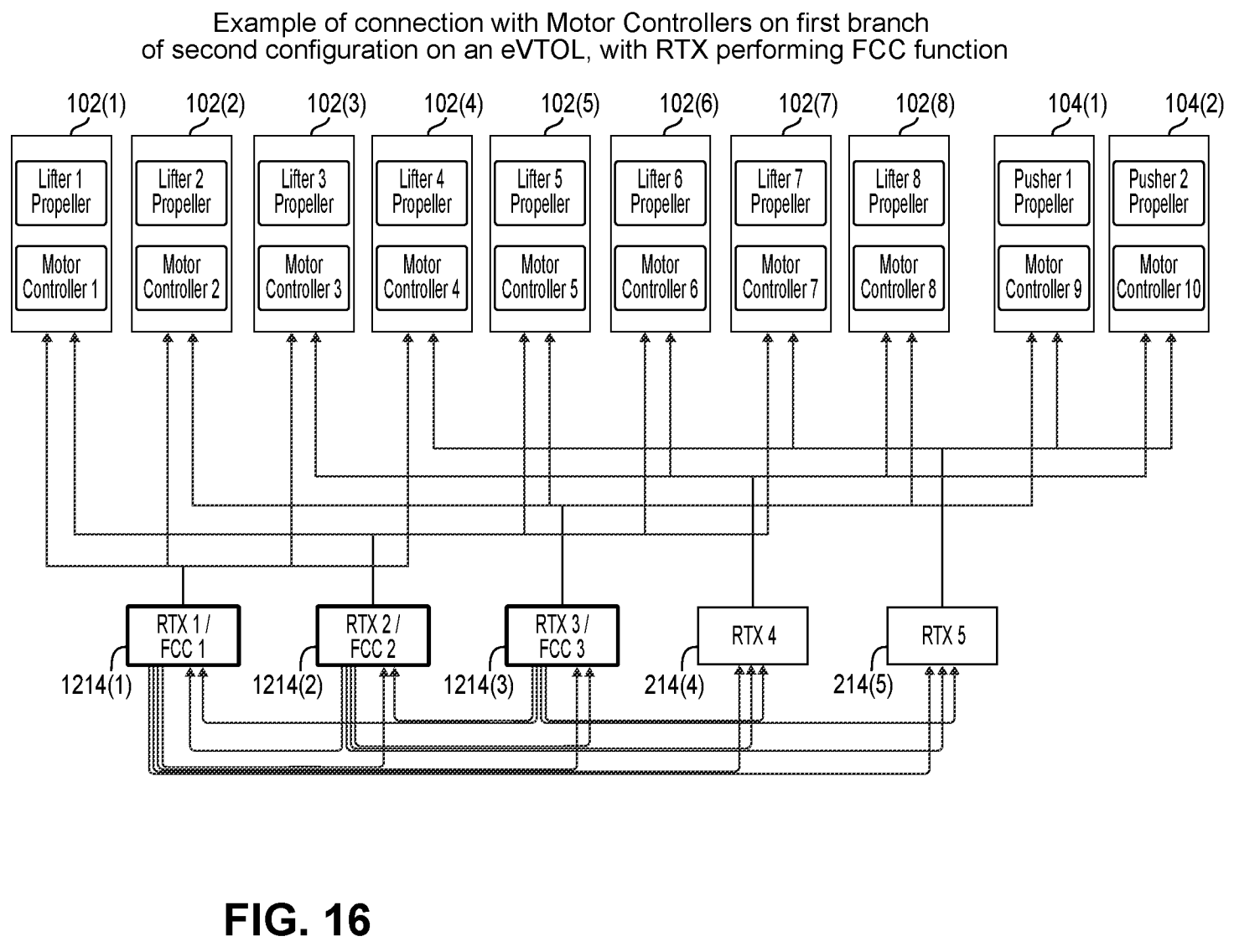

Example of connection with Motor Controllers on first branch
of second configuration on an eVTOL, with RTX performing FCC function 104(2) — Pusher 2 Propeller / Motor Controller 10

104(1) — Pusher 1 Propeller / Motor Controller 9

102(8) — Lifter 8 Propeller / Motor Controller 8

102(7) — Lifter 7 Propeller / Motor Controller 7

102(6) — Lifter 6 Propeller / Motor Controller 6

102(5) — Lifter 5 Propeller / Motor Controller 5

102(4) — Lifter 4 Propeller / Motor Controller 4

102(3) — Lifter 3 Propeller / Motor Controller 3

102(2) — Lifter 2 Propeller / Motor Controller 2

102(1) — Lifter 1 Propeller / Motor Controller 1

RTX 5 — 214(5)

RTX 4 — 214(4)

RTX 3 / FCC 3 — 1214(3)

RTX 2 / FCC 2 — 1214(2)

RTX 1 / FCC 1 — 1214(1)

FIG. 16

Example of connection with FCS Actuators on first branch
of second configuration on an eVTOL, with RTX performing FCC function Example of connection with Motor Controllers and actuators on a hybrid configuration on an eVTOL, with RTX performing FCC function Example of direct connection
of inceptors and FCCs Example of connection of inceptors with FCCs and SIM Example of connection of contactors
with FCCs 102(n)

Figure 21:
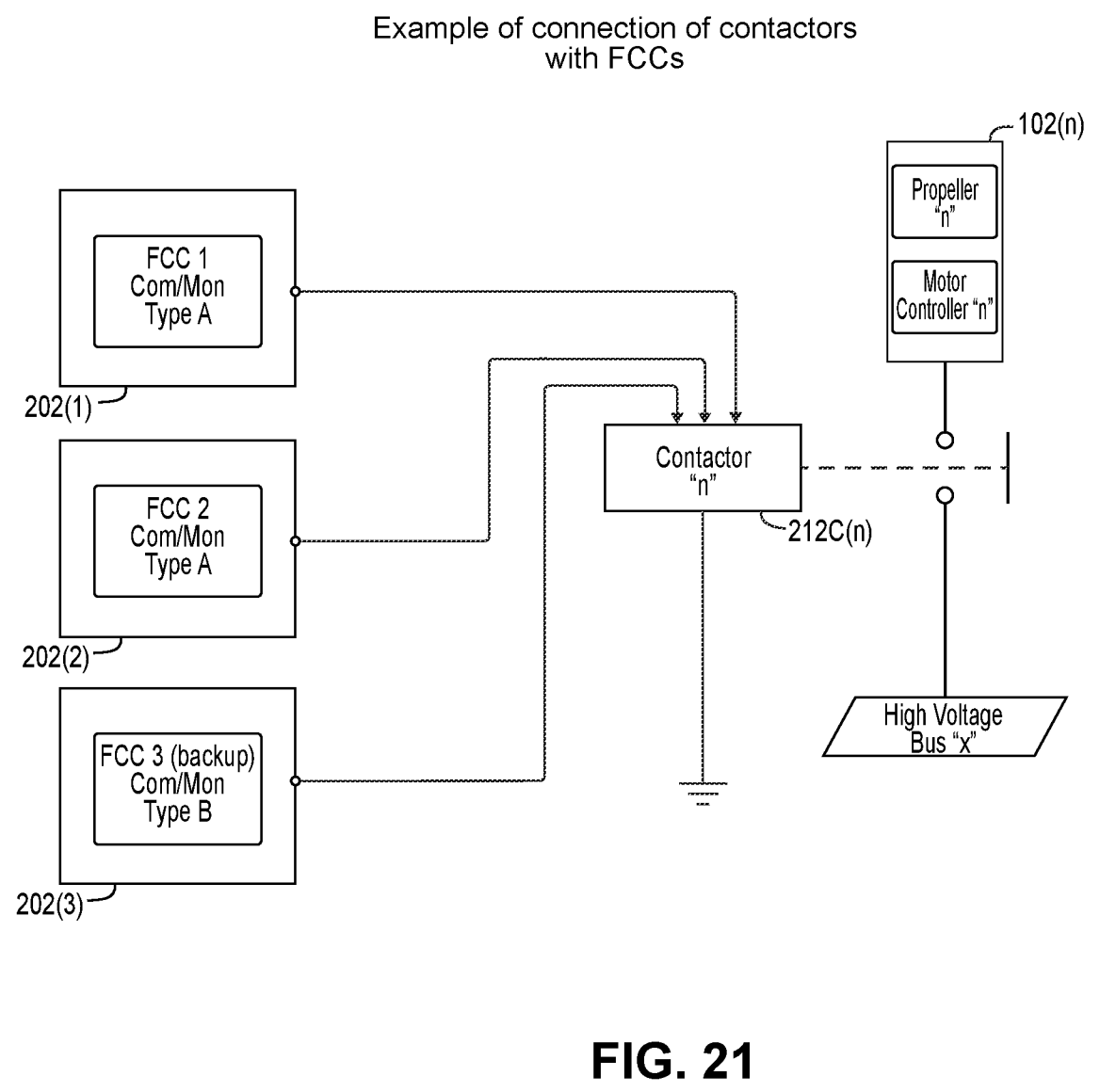

Propeller "n"

Motor Controller "n"

High Voltage Bus "X"

Contactor "n"

212C(n)

FCC 1 Com/Mon Type A

202(1)

FCC 2 Com/Mon Type A

202(2)

FCC 3 (backup) Com/Mon Type B

Example of connection of relays with FCCs

Example of connection of contactors
with FCCs via RTXs

Example of connection of relays
with FCCs via RTXs

FIG. 24

TRIPLEX FULLY REDUNDANT
FLY-BY-WIRE ARCHITECTURE

FIELD

The technology herein relates to vertical take-off and landing aircraft.

BACKGROUND

Urban air mobility (UAM) has the potential to radically reshape intra and intercity transportation.

There is a demand for Vertical takeoff and landing (VTOL) aircraft to serve passengers in an urban environment, based on design drivers such as safety, passenger experience, affordability and a very low footprint for the community, in terms of noise and emissions.

To improve VTOL efficiency, one key factor is vehicle weight. In order to reduce weight, some companies are proposing simplified Flight Control System (FCS) architectures, but they may not provide the availability of effectors necessary for this kind of vehicle.

Fly-by-Wire (FBW) is a technology commonly applied for medium and large size airplanes in which there is normally a high level of redundancy of effectors such that losing a set of effectors does not present a significant safety effect. See for example Yeh, "Design Considerations In Boeing 777 Fly-By-Wire Computers", Proceedings Third IEEE International High-Assurance Systems Engineering Symposium (Cat. No. 98EX231) (IEEE 1998).

Some helicopters have also used FBW, but such use is generally limited to guaranteeing that a traditional configuration of hydraulic actuators presents high availability. Small aircrafts typically do not use FBW due to the cost of the Line Replaceable Units (LRUs) involved. Such LRUs are devices that comply with the ARINC 429 standard to communicate on an avionics local area network. See for example Balmus, "Aircraft Data Acquisition", Incas Bulletin, Volume 8, Issue 1/2016, pp. 141-151, ISSN 2066-8201; ARINC Specification 429, Part 1-17, Annapolis, Maryland: Aeronautical Radio, Inc. (2004-05-17). However, the new classes of vehicles introduced by UAM need to use FBW to allow adequate controllability and also to allow Autonomous flights when there is no pilot on board. Accordingly, different design goals and constraints apply, opening new approaches. Thus, while much work on fault tolerant aircraft fly-by-wire control systems has been done in the past (see e.g., U.S. Pat. No. 11,099,936), further improvements are possible and desirable.

BRIEF DESCRIPTION OF THE DRAWINGS

FIG. 3A shows an example triplex FCC architecture without using retransmitters (RTXs).

FIG. 3B shows an example triplex FCC architecture using retransmitters (RTXs).

FIG. 3C shows functional exchanges in the example triplex FCC architecture.

FIG. 4A is a flowchart showing the process to select the method of generation of the triplex architecture.

FIG. 4B shows exclusive grouping of two units according to the theory of Complete Graph.

FIG. 6 shows an example of connection with FCS actuators on first configuration on an eVTOL.

FIG. 11 shows an example of connection with Motor Controllers on first branch of second configuration on an eVTOL.

FIG. 15 shows an example of connection with FCS actuators on second branch of second configuration on an eVTOL, with RTX performing FCC function.

FIG. 16 shows an example of connection with Motor Controllers on first branch of second configuration on an eVTOL, with RTX performing FCC function.

FIG. 21 shows an example of connection of contactors with FCCs.

FIG. 24 shows an example of connection of relays with FCCs via RTXs.

DETAILED DESCRIPTION OF NON-LIMITING EMBODIMENTS

Figure 1:
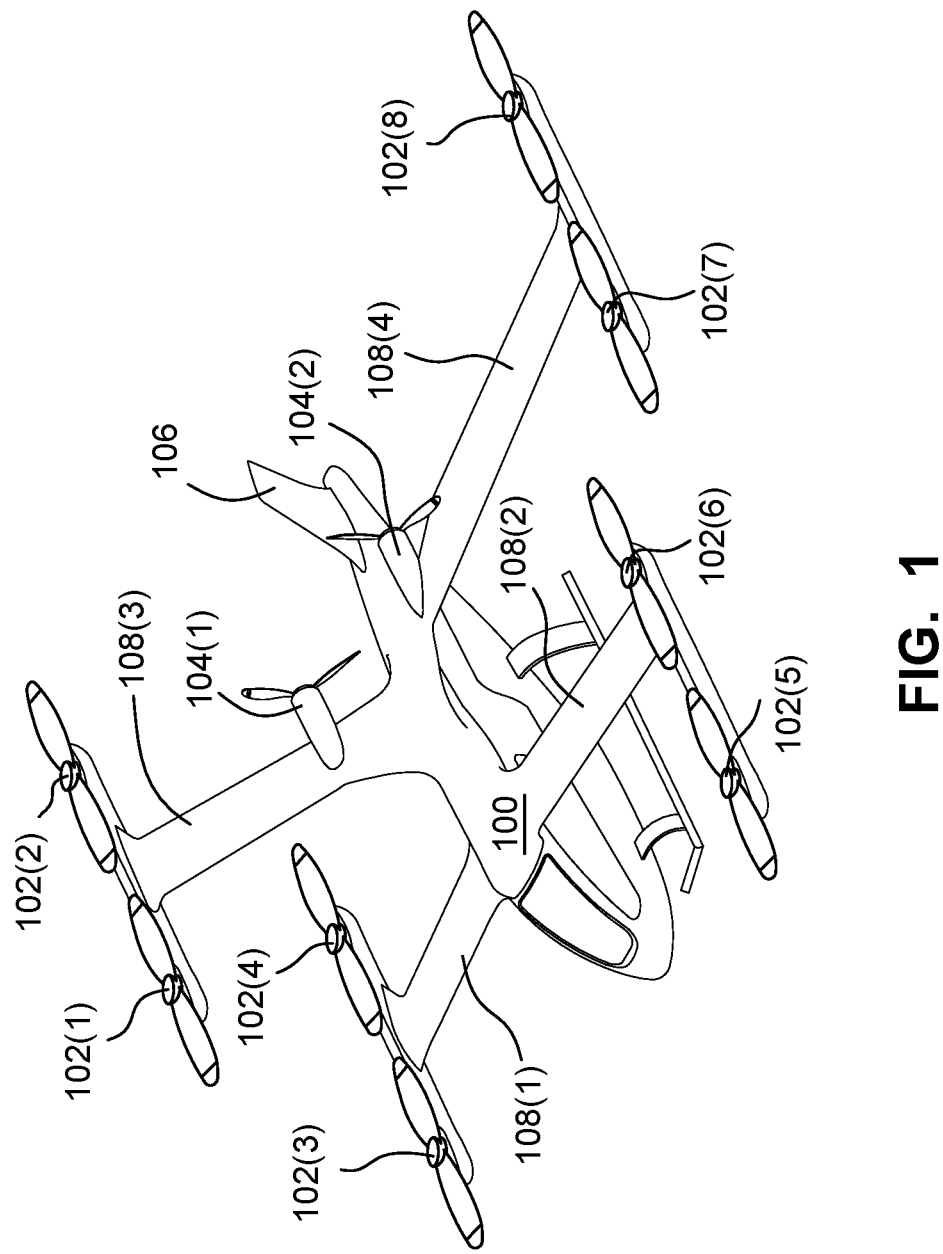
FIG. 1 shows an example VTOL.

The non-limiting subject matter herein provides apparatus, systems and methods in which a vertical takeoff and landing (VTOL) aircraft Fly-by-Wire (FBW) architecture has three Flight Control Computers (FCCs), where each FCC is connected to all controllers used for effector actuation. The intent is to achieve very high availability of all effectors. In one embodiment, the links from FCCs to effector actuators, or from FCCs to RTXs, is point to point (direct) to reduce the effect of bus messages collision For context, FIG. 1 shows an example VTOL aircraft 100 including eight elevation rotors 102 and two propulsion thrusters 104. Wings 108 provide lift when the VTOL 100 has sufficient forward velocity under power from thrusters 104. By controlling the various "effectors" such as rotors, thrusters and control surfaces (e.g., rudder 106), this VTOL aircraft is capable of moving in 6 degrees of freedom (6DOF), i.e.:

Pitch

Roll

Yaw

Up/down

Left/right

Forward/backward.

Plural such motions are often combined (e.g., so that the VTOL is pitching upwards while it is moving forward, etc.).

Using such different motions, the VTOL can be controlled to operate in different phases of flight, for example:

Hover is characterized by the phase of vertical takeoff or landing (primarily based on use of elevation rotors 102);

Transition is characterized by a phase in which there is a forward vehicle movement, but airspeed is not enough for the wing alone to provide lift to the VTOL (where the elevation rotors 102 maintain altitude and the thrusters 104 provide forward thrust); and Cruise is characterized by a phase in which there is a forward vehicle movement and airspeed is enough for the wing alone to provide lift to the VTOL (in this phase, the wings 108 provide lift and the thrusters 104 provide forward thrust).

In this context, the term "effector" refers to items that produce change in aerodynamic behavior of the vehicle such as flight control surfaces, tilt mechanisms, propellers, etc. In an eVTOL (a VTOL which is all-electric or hybrid-electric powered), flight control surfaces and tilt mechanisms are effectors that are precisely positioned by actuators. Propellers are effectors that are spin driven by propulsion motors, also known as electric engines. For simplification, flight controls actuators and propulsion motors will herein be referred as "effector actuation means" or "effector actuators".

Figure 2:
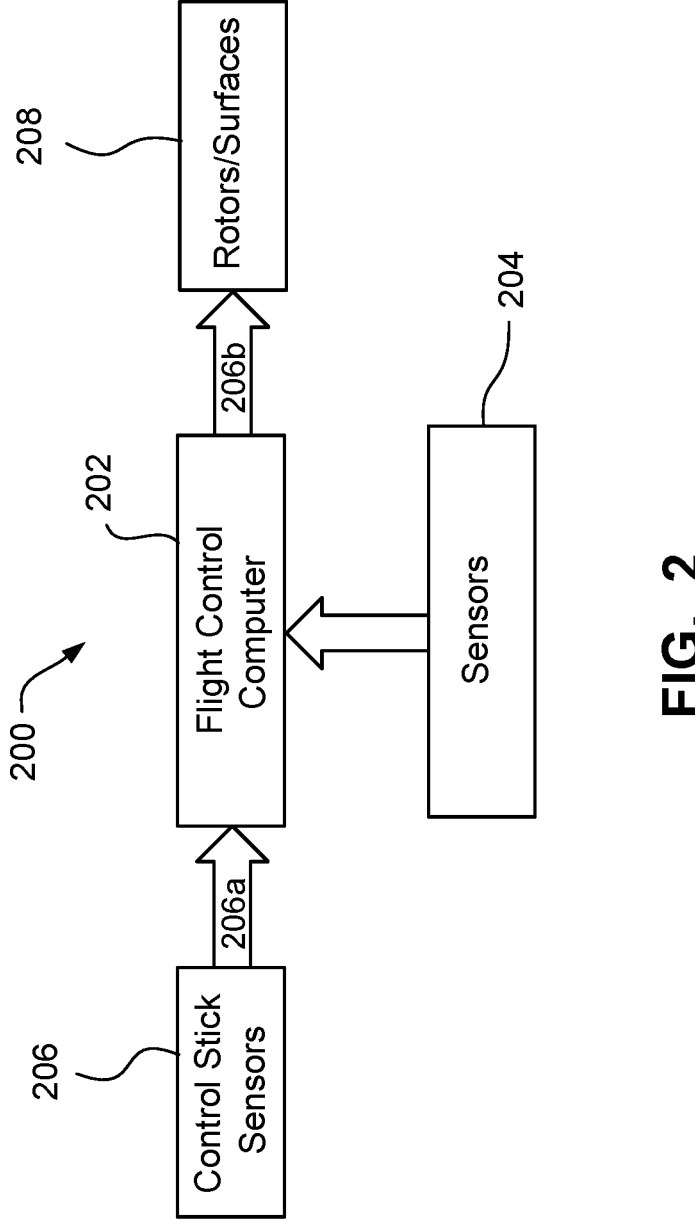
FIGS. 2 & 2A show example system block diagrams of a VTOL control architecture.
Figure 2A:
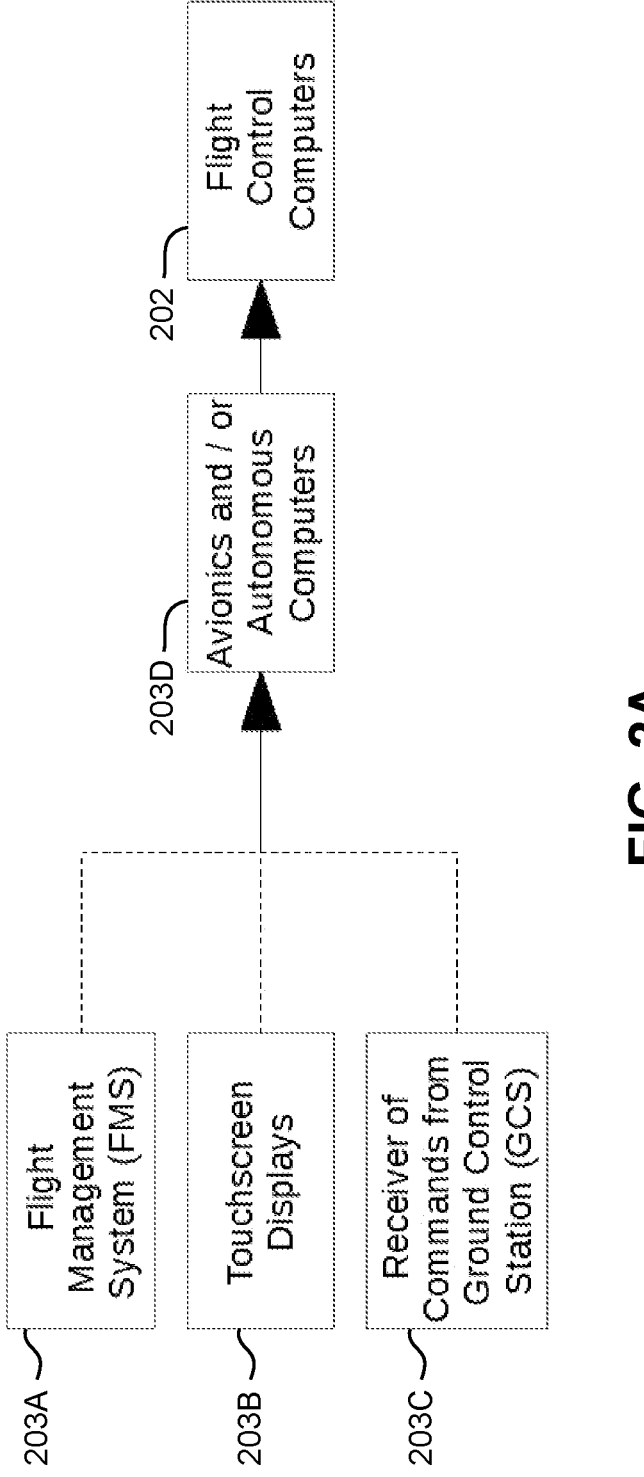

FIGS. 2 & 2A show example block diagrams of a control system on board the FIG. 1 eVTOL aircraft. The FIG. 2 VTOL FBW system 200 includes a cluster of flight control computers 202 that receives input signals from inceptors 206 and sensors 204, and provides control outputs to control effectors such as rotors 102, thrusters 104 and control surfaces 106 and 108. Flight control computer cluster 202 typically executes instructions stored in one or more non-transient memories to perform operations. As FIG. 2A shows, flight control computers 202 may be operatively coupled to and receive or exchange inputs or other signals from avionics and/or autonomous computers 203D, which in turn may be coupled to receive inputs from or exchange signals with a flight management system (FMS) 203A, touchscreen display(s) 203B located for example in a cockpit, and a receiver 203C in radio contact with a ground control station (GCS) that receives commands from the ground control station.

These example program control steps receive command inputs 206a from inceptors 206, and map those command inputs into desired vehicle response. Such mapping can involve lookup tables, control laws and/or other dynamic algorithms, and can take into account the current phase of flight of the eVTOL such that the mapping is different depending on the current phase of flight. Phase of flight may be determined by voting sensors 204 such as Air Data, Inertial, GPS, and possibly others also, but not necessarily all of them, as well as current control state indicators. In case some sensor outputs are invalid or not available, the remaining ones are used to provide fault tolerance. The FCCs 202 calculate control outputs and map the control outputs 206b to control effectors such as control surface 106 and 108 actuators and the motors or engines that provide rotational energy to further effectors such as rotors 102 and thrusters 104. The transformation of inceptor inputs to outputs to the effectors (actuators, rotors, thrusters, tilting mechanisms, etc.) may be based on the phase of flight and a predetermined control allocation programmed into the FCCs.

Each effector may have just one effector actuation means or effector actuator, but it may have more than one, such in a case of a flight control surface driven by two actuators. Each effector actuation means or effector actuator may have a controller embedded therein, such as in a smart actuator, or may have the controller as a separate unit, or may have no separate controller. Each controller may control one or more effector actuation means or effector actuator. The function of the controller is to receive commands and to control one or more effector actuation means or effector actuator. Controllers for eVTOL can for example be or comprise motor controllers or actuator controllers.

Connections or links between controllers and effector actuation means or effector actuators may be either direct or indirect. Also, the connections or links may use digital buses, optical buses, wireless channels, analog buses, ARINC 429 busses, or any combination of these.

The three FCCs 202 may be all of the same type, or may be of two different types, or may be of three different types (i.e., one, two or three FCCs may be of the same type or they may all be of different types). They may be in various forms such as Flight Control Module (FCM), Flight Control Unit (FCU), etc. Some may be simpler backup units.

Each FCC 202 may be composed by a single lane. They may also be composed by at least one Command lane and at least one Monitor lane. They may also be composed of more than two lanes. The lanes may be packed in a single LRU or distributed among two or more LRUs. In case the FCC 202 has single lanes, its output may be confirmed by another device on the same LRU, at an external LRU before transmitting the signal to the effector actuation means or effector actuator, or the output can be confirmed/verified at the effector actuation means or effector actuator assigned to that lane. This confirmation may be in form of signals voting or by a source selection mechanism.

In case the FCC 202 has at least one Monitor lane to guarantee integrity of the output of the Command lane or lanes, then the effector actuation means or effector actuator, or other LRUs in between the FCC and the effector actuation means or effector actuator, may rely on Checksum, CRC, authentication, verification or other mechanism to verify signal integrity before the signal is used for commanding the effector actuation means or effector actuator. Such verification ensures that a faulty command is not acted upon to effect flight of the eVTOL.

It is desirable for a fly-by-wire architecture to balance between adding complexity and guaranteeing availability.

On safety critical applications, to avoid loss of control in the event of a single failure, the minimum number of flight control computers 202 is two units to provide redundancy. If availability is guaranteed with only two FCCs 202, the architecture has reduced complexity and may have enough redundancy to prevent loss of control due to single point failure. If the safety assessment determines that two FCCs 202 are not enough, a triplex architecture with three FCCs 202 is recommended as it may provide high availability while still limiting complexity. Architectures with four FCCs 202 are still manageable but the level of complexity starts to grow. The main concern regarding growing the number of FCCs 202 is in terms of flight mode coordination between them, as working in different modes at the same time may cause undesirable behavior to the overall operation of effectors. The miscoordination of the effectors might ultimately lead the vehicle to deviate from expected trajectory.

Typical FBW architectures take credit of the redundant controllers to distribute the commands in a way to avoid losing too many effectors in case of failures. In some architectures, half of the effectors may be lost in case of failures, or one third of the effectors may be lost, or another portion may be lost, and the vehicle will still function safely e.g., in the sense of being able to land safely in a controlled landing.

The high availability architecture proposed here allows all, or at least the majority, of the effectors to continue to be operational even in case of loss of two of the three flight control computers 202.

Such architecture is especially important in vehicles that perform vertical takeoff and landing (VTOL) in which the effectors must be commanded with a high degree of coordination among them to avoid even momentary unstable behavior.

There are some possible configurations to achieve this, which can also be combined to generate hybrid configurations.

Example eVTOL Control System Configurations

Figure 3B:
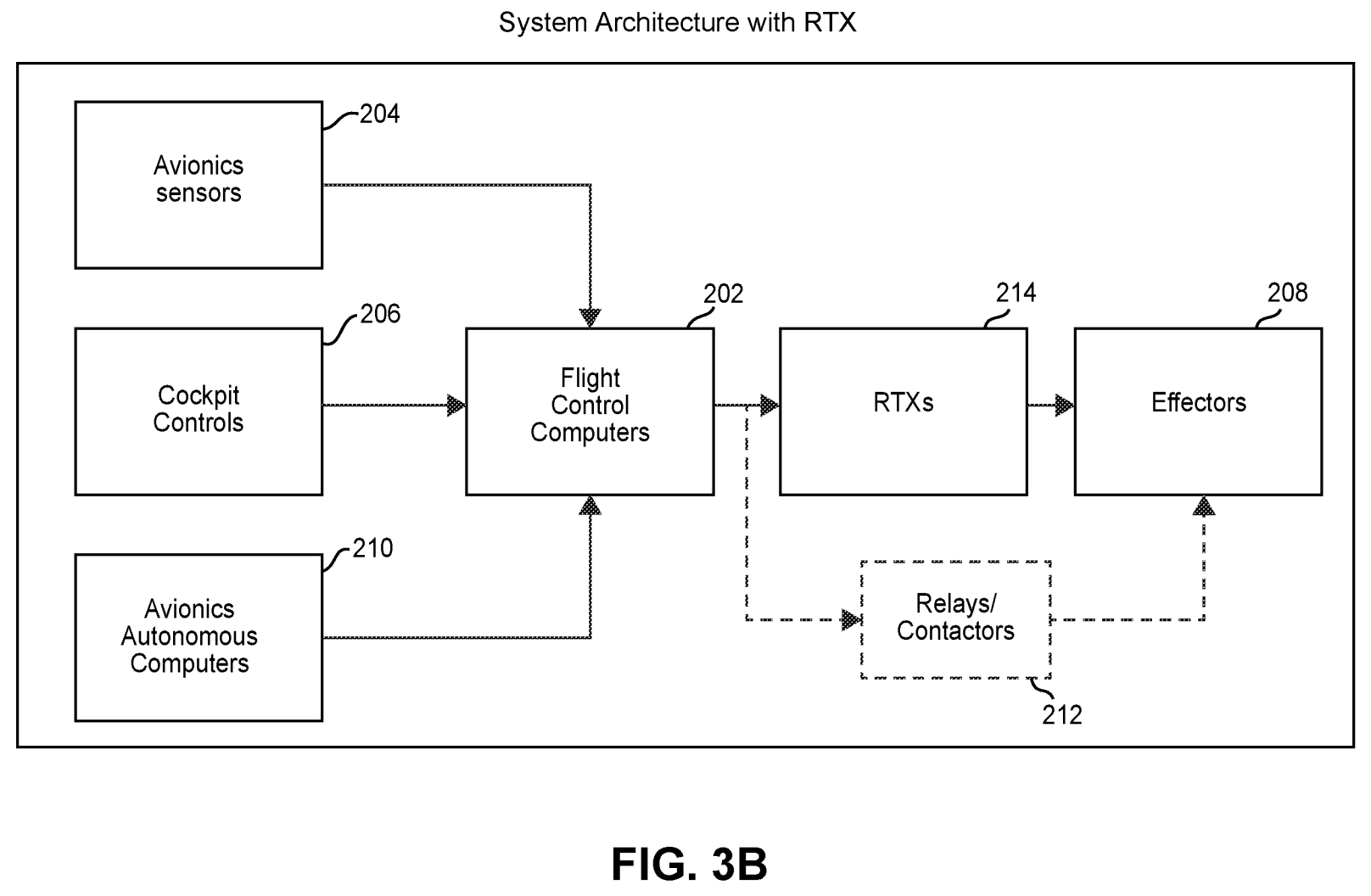

FIG. 3A shows a more detailed system architecture without retransmitters (RTXs) and FIG. 3B shows a more detailed system architecture with RTXs. In each case, the avionics sensors 204, cockpit controls 206 and avionics/autonomous computer 210 communicate with a cluster of flight control computers (FCCs) 202. The flight control computers 202 may disengage faulty effectors 208 either directly or through relays/contactors 212. FIG. 3B shows that for at least some configurations, the flight control computers 202 control the effectors through RTX devices 214. The term RTX 214 may refer to various different types of units depending on which function they perform such as voting, source selection, etc. Some examples are Remote Electronic Unit (REU), Remote Data Concentrator (RDC), Inceptor Interface Module (IIM), Input Output Module (IOM), etc.

FIG. 3C shows an example functional flowchart of how the above-described example system operates and thus describes the functional exchanges in the example triplex FCC architecture. In the example shown, command inputs 252 generated for example by cockpit controls 206 (which may include pilot inceptors) are applied to the FCCs 202. The FCCs 202 may receive command from several sources such as from cockpit controls 206 or from autonomous computers 210. The FCCs 202 also receive data from several vehicle sensors 204. Based on this information, each FCC in the FCC cluster 202 computes its state and compares with others to determine which of the plurality of FCCs in the cluster is in control (block 256). The FCCs 202 command and update effector state (blocks 258, 264). The FCCs 202 may also allocate response to the effectors (block 260).

The controllers of effector actuation means or effector actuators receive inputs and determine the correct source to be used based on the FCC 202 in control and priority logic implemented at the controller. The state of the actuator may change based on the input or based on external elements such as relays or contactors 212. The actuators (whether controlled through or not through RTX devices 214) move the effectors (block 266) in response to the selected command(s). Sensors 204 may monitor the movement and/or position of the effectors, and report that information to the FCCs 202, which receive the sensor data (block 268) and use it in conjunction with command inputs (block 252) to further determine and control vehicle response in a closed-loop control system (block 254).

Besides the connections between the FCCs 202 and the effector actuation means or effector actuator, some embodiments herein use direct connections from the flight deck inceptors 206 to the FCCs 202, or through the use of Sensor Interface Modules (SIM), whenever necessary.

Figure 4C:
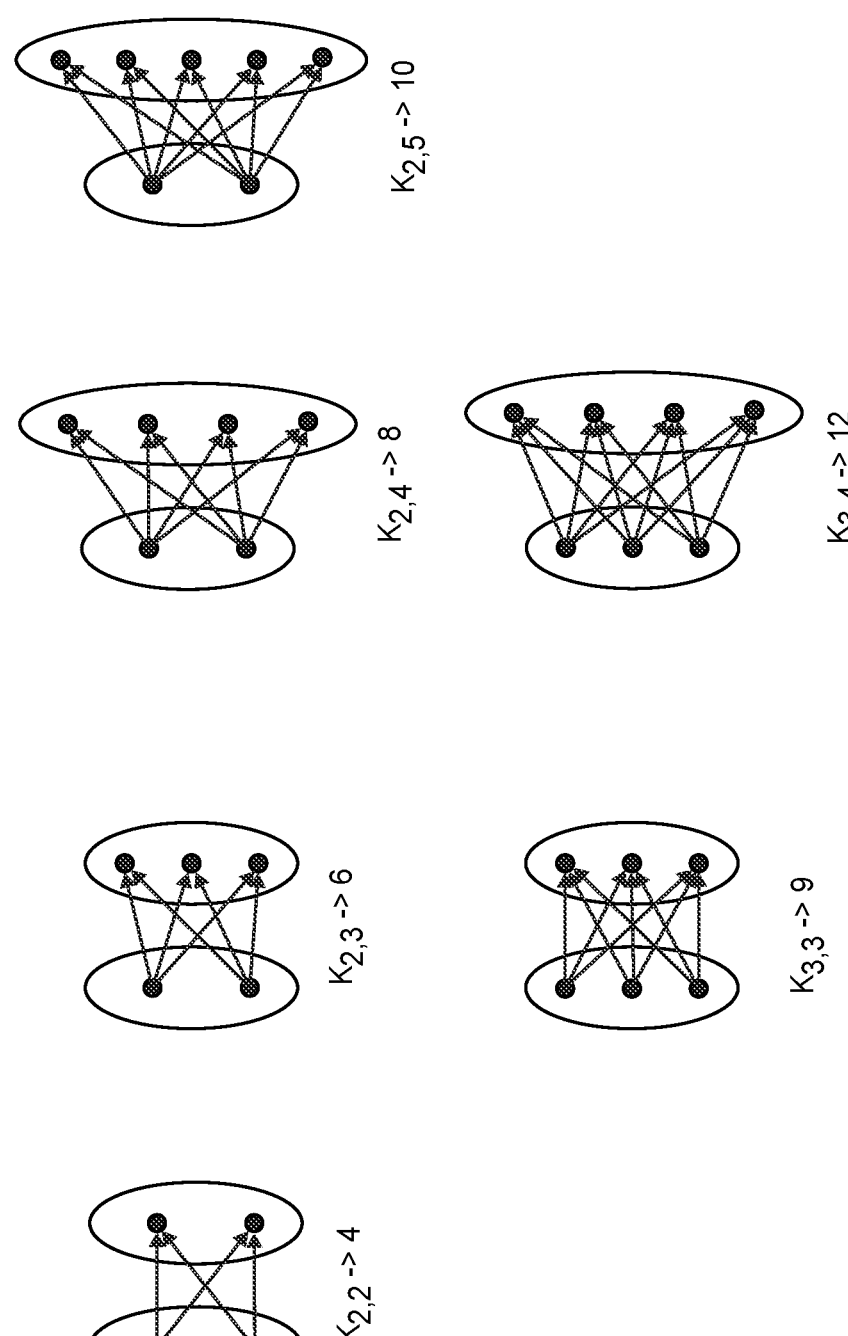
FIG. 4C shows exclusive grouping of two types of units according to the theory of Bipartite Graph.

Example embodiments herein thus include or provide the following features:

1. A first configuration (see FIG. 3A) consists in having controllers of effector actuation means or effector actuators able to receive commands from at least three sources. In such configuration, the cluster of FCCs 202 includes three FCCs, and each of the three FCCs is directly linked to each controller. See FIG. 4A blocks 275, 279. This configuration has the advantage of reducing the number of LRUs, possibly reducing overall vehicle weight. It also reduces the delay of commands from the FCC cluster 202 to effector actuation means or effector actuators, thereby improving controllability.

2. A second configuration (see FIG. 3B) consists in having retransmitters (RTX) 214 that receive commands from the FCCs 202 and then retransmit those commands to the controllers (FIG. 4A, "No" exit to decision block 275 and block 277). The effector actuation means or effector actuators in this configuration are indirectly linked to the FCCs. In this configuration the number of retransmitters (RTXs) may be the same number of controllers, more than this, or less than this. If there is the same number of RTXs 214 and controllers, they may be linked one to each other or many-to-many, such as each controller receives commands from two or more RTX. To achieve high availability, it is proposed that RTXs 214 are linked such that in the event of loss of any two RTXs, the majority of the effector actuation means or effector actuators will continue to be operational. The minimum number of RTXs 214 to achieve such goal in one embodiment can be determined using the theory of complete graphs or bipartite graphs (see FIG. 4A) depending on whether one or more types of RTXs are used in the architecture. See FIG. 4A, decision block 280. If the RTXs 214 are all of the same type, the theory of complete graphs can be used. See FIG. 4A block 282 and FIG. 4B. A simple graph with n vertices is said to be complete if there is an edge between every pair of vertices. If two different types of RTXs 214 are used, the theory of bipartite graphs can be used. See FIG. 4A block 284 and FIG. 4C. A bipartite graph is a graph in which the vertices can be partitioned into two disjoint sets V and W such that each edge is an edge between a vertex in V and a vertex in W 3. In the first branch of the second configuration, the minimum number of RTXs 214 is determined by the maximum number of controllers of the same category. The effector actuation means or effector actuators may be grouped in categories which may be for example the category of surface actuators, the category of motor controllers, or any other meaningful category. If E is the maximum number of controllers of the category with greater number of elements, then, if n is the minimum number of RTXs 214, according to the theory of complete graphs of FIG. 4B, it can be determined by finding the value of n that results in the minimum value of K such that K is greater or equal to E, where $K=n*(n-1)/2$.

4. In a second branch of the second configuration, the minimum number of RTXs 214 is also determined by the maximum number of controllers of the same category. If E is the maximum number of controllers of the category with a greater number of elements, then, if m is the minimum number of RTXs 214 of a first type and n is the minimum number of RTXs 214 of a second type, according to the theory of bipartite graphs of FIG. 4C, the values of m and n can be determined by finding any combination in which the values of m and n result in the minimum value of K such that K is greater than or equal to E, where it is given by $Km,n=m*n$. In this case, more than one solution is possible and therefore more or less RTXs 214 of a first type may be used depending e.g., on the number of RTXs of the second type to be used.

The Below-Described Features of Example Non-Limiting Embodiments May Be Used Individually or Together in Any Combination of the following:

A first Flight Control system configuration, and the method to obtain such first configuration, has controllers of effector actuation means or effector actuators able to receive commands directly from at least three Flight Control Computers (FCCs).

Each of the three FCCs is directly linked to each of the controllers, being only one FCC active at a time.

Each FCC has a command lane to send commands to the controllers and a monitor lane to check command integrity.

Two of the three FCCs are of the same part number and one of the three FCCs being of a backup of dissimilar part number; or the three FCCs are of the same part number to reduce complexity of the solution.

Each of the three FCCs are connected to some or to all of independent sensors located on the surfaces, propellers and or mechanisms of the effectors; or each of the three FCCs receives sensor information from at least one Sensor interface module (SIM).

Each sensor interface module has a single lane to read at least one of independent sensors located on the surfaces, propellers and or mechanisms of the effectors.

At least one of the three FCCs receives instructions from at least one Avionics computer. The Avionics computer(s) is responsible to send high level instructions to the FCCs, including at least one of the following: navigation commands, Autonomous commands, commands from a remote controller, commands from a touch screen display.

Alternatively or in conjunction with the above, each of the three FCCs is connected to flight deck inceptors, where each FCC is directly connected to at least one sensor of each axis of control of flight deck inceptors.

Alternatively or in conjunction with the above, each of the three FCCs receives sensor information from at least one sensor interface module (SIM). Each sensor interface module has a single lane to read at least one sensor of each axis of control of the flight deck inceptors.

Each FCC exchanges, with the other FCCs, part or all of its processed information and/or the information received from other components which include at least one of the following: the flight deck inceptors and/or effector sensors, as well as mode and state information, among other information, to allow data voting and mode coordination among the FCCs.

The effector actuation means or effector actuator is classified in: surface actuators, tilt mechanism actuators, and propeller electric motors. The controllers of surface actuators and tilt mechanisms have a single lane that receives the commands from the FCCs and executes the command from the active FCC if the command is considered fresh and valid by the actuator, otherwise switching to the second FCC with highest priority if fresh and valid, otherwise switching to the last FCC.

The surface actuators and tilt mechanisms receive each a link from the FCCs that enables or disables each actuator based on high integrity criteria implemented at the FCCs. Alternatively or in combination, each surface actuator and tilt mechanism is energized/de-energized by a relay commanded by the FCCs.

The controllers of propeller electric motors have a single lane that receives the commands from the FCCs and executes the command from the active FCC if the command is considered fresh and valid by the controller, otherwise switching to the second FCC with highest priority if fresh and valid, otherwise switching to the last FCC.

The propeller electric motors controllers receive each a link from the FCCs that enables or disables each motor based on criteria implemented at the FCCs.

Alternatively, each propeller electric motor controller is energized/de-energized by a contactor commanded by the FCCs.

Alternatively, the controllers of propeller electric motors have a control lane and a monitor lane that receives the commands from the FCCs and execute the command from the active FCC if the command is considered fresh and valid by the controller, otherwise switching to the second FCC with highest priority if fresh and valid, otherwise switching to the last FCC.

A further Flight Control system configuration, and the method to obtain such second configuration, has retransmitters (RTX) that receive commands from the three FCCs and then retransmit to the controllers of effector actuation means or effector actuators.

The term RTX may refer to many different types of units depending on which function they perform such as voting, source selection, etc. Some examples are Remote Electronic Unit (REU), Remote Data Concentrator (RDC), Inceptor Interface Module (IIM), Input Output Module (IOM), etc.

At least one RTX receives commands from each of the three FCCs. At least one RTX receives the commands from the FCCs and retransmits the command from the active FCC if the command is considered fresh and valid, otherwise switching to the second FCC with highest priority if fresh and valid, otherwise switching to the last FCC.

Alternatively to or in conjunction, at least one RTX receives the commands from the three FCCs and retransmits all of them. Alternatively to or in conjunction, at least one RTX receives commands from each of the three FCCs and votes the commands for retransmitting a voted value.

Alternatively, some of the RTXs are also FCCs, reducing the number of LRUs.

Each of the three FCCs is indirectly linked to each of the controller of effector actuation means or effector actuator.

At least one FCC has a command lane to process and send commands to the controllers and a monitor lane to check command integrity.

Alternatively to or in conjunction, at least one FCC has a single lane to process and send commands to the controllers.

Each of the three FCCs is of dissimilar part numbers. Or the three FCCs are of the same part number to reduce complexity of the solution.

Each of the three FCCs are connected to some or to all of independent sensors located on the surfaces, propellers and or mechanisms of the effectors.

Alternatively to or in conjunction, each of the three FCCs receives sensor information from at least one Sensor interface module (SIM). Each sensor interface module has a single lane to read at least one of independent sensors located on the surfaces, propellers and or mechanisms of the effectors.

At least one of the three FCCs receives instructions from at least one Avionics computer The Avionics computer(s) is responsible to send high level instructions to the FCCs, including at least one of the following: navigation commands, Autonomous commands, commands from a remote controller, commands from a touch screen display.

Alternatively or in conjunction, each of the three FCCs is connected to flight deck inceptors. Each FCC is directly connected to at least one sensor of each axis of control of flight deck inceptors.

Alternatively or in conjunction, each of the three FCCs receive sensor information from at least one sensor interface module (SIM). Each sensor interface module has a single lane to read at least one sensor of each axis of control of the flight deck inceptors.

Each FCC exchanges, with the other FCCs, part or all of its processed information and/or the information received from other components which include at least one of the following: the flight deck inceptors and/or effector sensors, as well as mode and state information, among other information, to allow data voting and mode coordination among the FCCs.

At second configuration, each controller of effector actuation means or effector actuators receives command from at least two RTXs.

The controllers of surface actuators and tilt mechanisms have a single lane that receives the commands from the RTXs and executes the source with highest priority if the command is considered fresh and valid by the controller, otherwise switching to the other(s) source(s) with highest priority if fresh and valid.

The surface actuators and tilt mechanisms receive at least a link from the RTXs that enables or disables each controller based on high integrity criteria implemented at the RTXs.

Alternatively, the surface actuators and tilt mechanisms receive at least a link from the FCCs that enables or disables each controller based on high integrity criteria implemented at the FCCs.

Alternatively or in conjunction, each surface actuator and tilt mechanism is energized/de-energized by a relay commanded by the RTXs.

The controllers of propeller electric motors have a single lane that receives the commands from the RTXs and executes the command from the source with highest priority if the command is considered fresh and valid by the con-troller, otherwise switching to the other(s) source(s) with highest priority if fresh and valid.

The propeller electric motors controllers receive at least a link from the RTXs that enables or disables each motor based on criteria implemented at the RTXs. Alternatively or in conjunction, the controllers of propeller electric motors receive at least a link from the FCCs that enables or disables each controller based on high integrity criteria implemented at the FCCs.

Alternatively or in conjunction, each propeller electric motor controller is energized/de-energized by a contactor commanded by the RTXs.

Alternatively to or in conjunction, the controllers of propeller electric motors have a control lane and a monitor lane that receive the commands and execute the command with highest priority if the command is considered fresh and valid by the controller, otherwise switching to the other(s) source(s) with highest priority if fresh and valid.

A method to obtain the architecture with the minimum number of RTXs of second configuration is determined using either the theory of complete graphs or bipartite graphs depending on whether one or more types of RTXs are used in the architecture. The minimum number of RTXs of second configuration, if all RTXs are all of the same type, is determined by the theory of complete graphs. The minimum number of RTXs of second configuration, if two different types of RTXs are used, is determined by the theory of bipartite graphs. The architecture with minimum number of RTXs is determined by the maximum number of controllers of the same category. The controllers may be grouped in categories which may be, for example, the category of surface actuators, the category of motor controllers, or any other meaningful category.

On a first branch, if E is the maximum number of controllers of the category with greater number of elements, then, if n is the minimum number of RTXs, according to the theory of complete graphs, it can be determined by finding the value of n that results in the minimum value of K such that K is greater or equal to E, where $K=n*(n-1)/2$.

On a second branch, the architecture with minimum number of RTXs is also determined by the maximum number of controllers of the same category. If E is the maximum number of controllers of the category with greater number of elements, then, if m is the minimum number of RTXs of a first type and n is the minimum number of RTXs of a second type, according to the theory of bipartite graphs, the values of m and n can be determined by finding any combination in which the values of m and n result in the minimum value of K such that K is greater than or equal to E, where it is given by $Km,n=m*n$. In this case, more than one solution is possible and therefore it can be used more or less RTXs of a first type depending on the number of RTXs of the second type.

A further Flight Control system configuration, and the method to obtain such third configuration, is a hybrid configuration.

In the hybrid configuration, the controllers of propeller electric motors receive commands directly from at least three Flight Control Computers (FCCs). Each of the three FCCs is directly linked to at least one of the controllers of propeller electric motors, being only one FCC active at a time.

The controller(s) of propeller electric motor(s) has a single lane that receives the commands from the FCCs and executes the command from the active FCC if the command is considered fresh and valid by the controller, otherwise switching to the second FCC with highest priority if fresh and valid, otherwise switching to the last FCC.

The controller(s) of propeller electric motor(s) receives each a link from the FCCs that enables or disables each motor based on criteria implemented at the FCCs.

Alternatively, each propeller electric motor controller is energized/de-energized by a contactor commanded by the FCCs. Alternatively, the controller(s) of propeller electric motor(s) have a control lane that receive the commands from the FCCs and execute the command from the active FCC if the command is considered fresh and valid by the controller, otherwise switching to the second FCC with highest priority if fresh and valid, otherwise switching to the last FCC.

A monitor lane forces safe state of the respective controller of propeller electric motor in case of misbehavior of the control lane.

The hybrid configuration has retransmitters (RTX) that receive commands from the three FCCs and then retransmit to the remaining controllers of effector actuation means or effector actuators. Each remaining controller receives command from at least two RTXs.

The method to obtain the architecture with the minimum number of RTXs is determined using either the theory of complete graphs or bipartite graphs depending on whether one or more types of RTXs are used in the architecture. Alternatively, some of the RTXs are also FCCs, reducing the number of LRUs.

NON-LIMITING EXAMPLES

To exemplify the use of such configuration, an eVTOL such as shown in FIG. 1 has the following effectors: 8 propellers 102 on the top called lifters; 2 propellers 108 on the back for forward thrust called pushers; four longitudinal actuators, four roll actuators and two rudder actuators to drive flight control surfaces such as rudder 106.

Example 1

As an example of use of the first configuration for the eVTOL, each controller of the effector actuation means or effector actuator is able to receive three sources of input, and each of the three FCCs 202 is directly connected to each controller.

Figure 5:
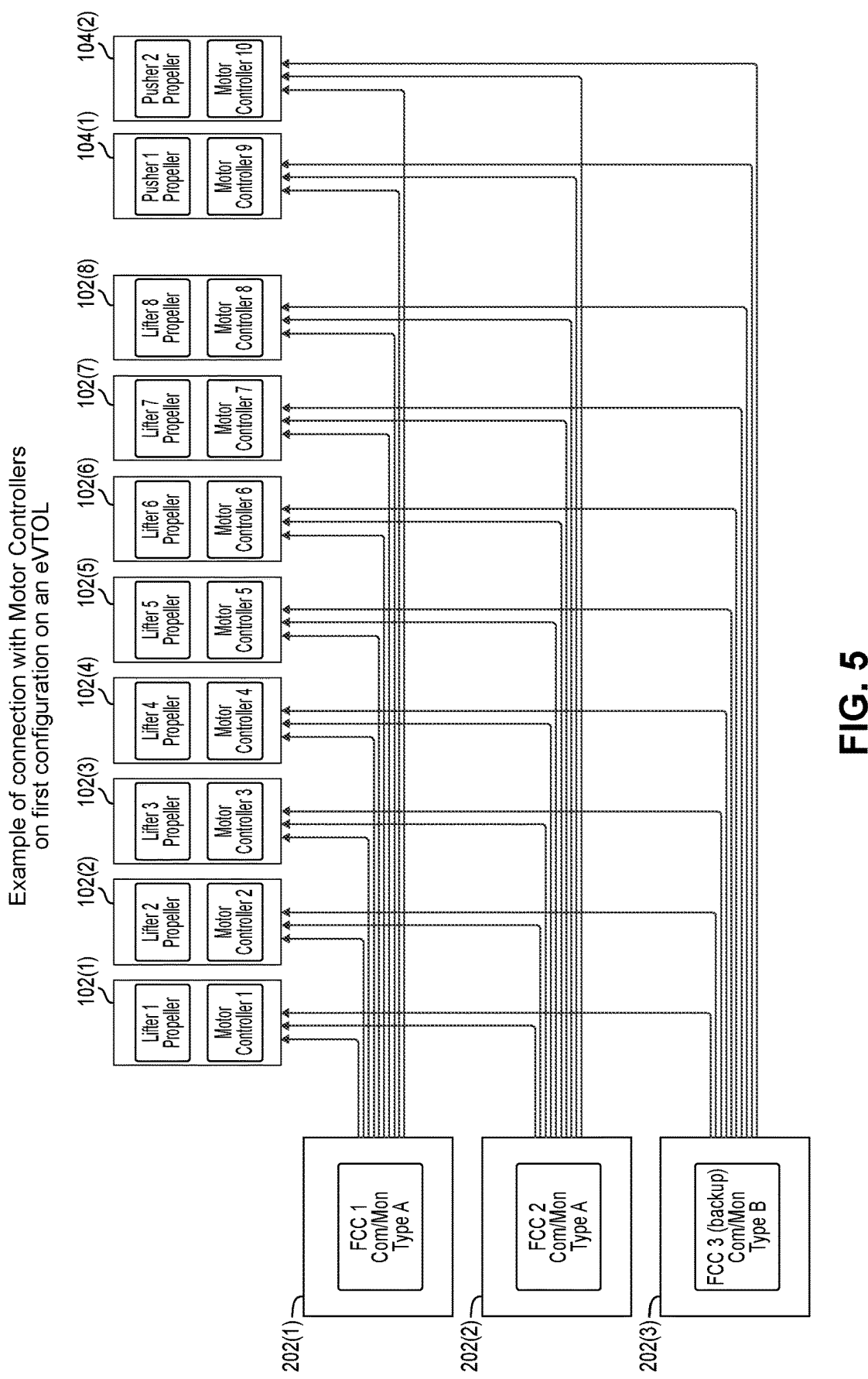
FIG. 5 shows an example of connection with Motor Controllers on a first configuration on an eVTOL.

FIG. 5 shows an example using the first configuration to control the propellers of an eVTOL. In a further refinement, this FIG. 5 shows FCC1 202(1) and FCC2 202(2) of the same type and using a Command/Monitor architecture to provide data at high integrity for the controllers. By receiving high integrity data, the controllers do not need to vote received data, but just verify that the source is valid before using the data for commanding. In this way, the controllers can implement a simple source selector instead of a voting algorithm. In case of loss of invalid data from FCC1 202(1) and FCC2 202(2), the controllers use data from the backup FCC3 202(3), which in this embodiment is another type of computer different from the types of computers used to implement FCC1 and FCC2 and is also based on the Command/Monitor architecture.

FIG. 6 shows the same three FCCs 202 of FIG. 5. FIG. 6 shows just the connection of the FCCs with example Flight Control System (FCS) actuators that control the aerodynamic control surfaces 180 such as rudder 106, tilt mechanisms, and other flight control effectors.

Example 2

Figure 7:
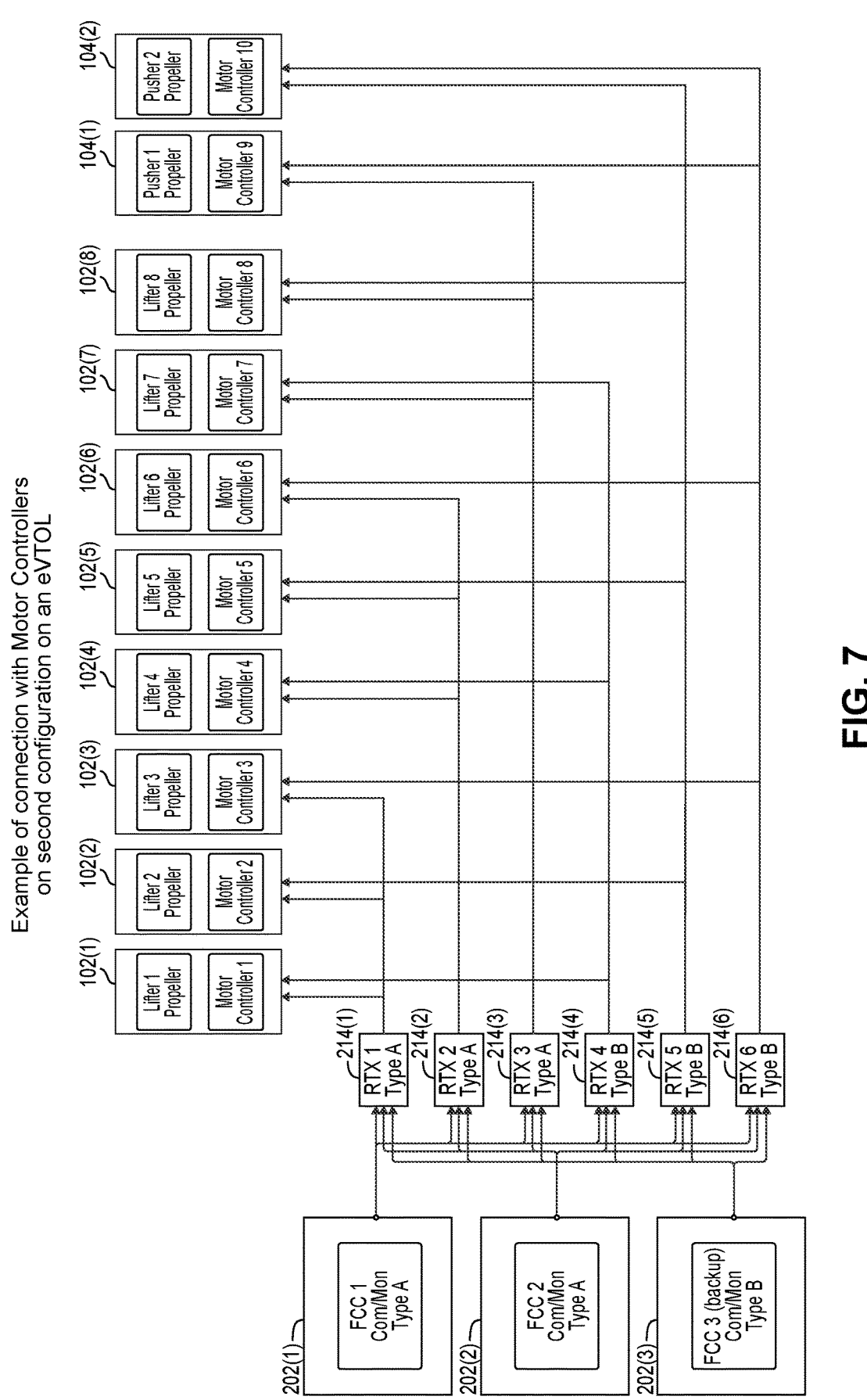
FIG. 7 shows an example of connection with Motor Controllers on second configuration on an eVTOL.
Figure 8:
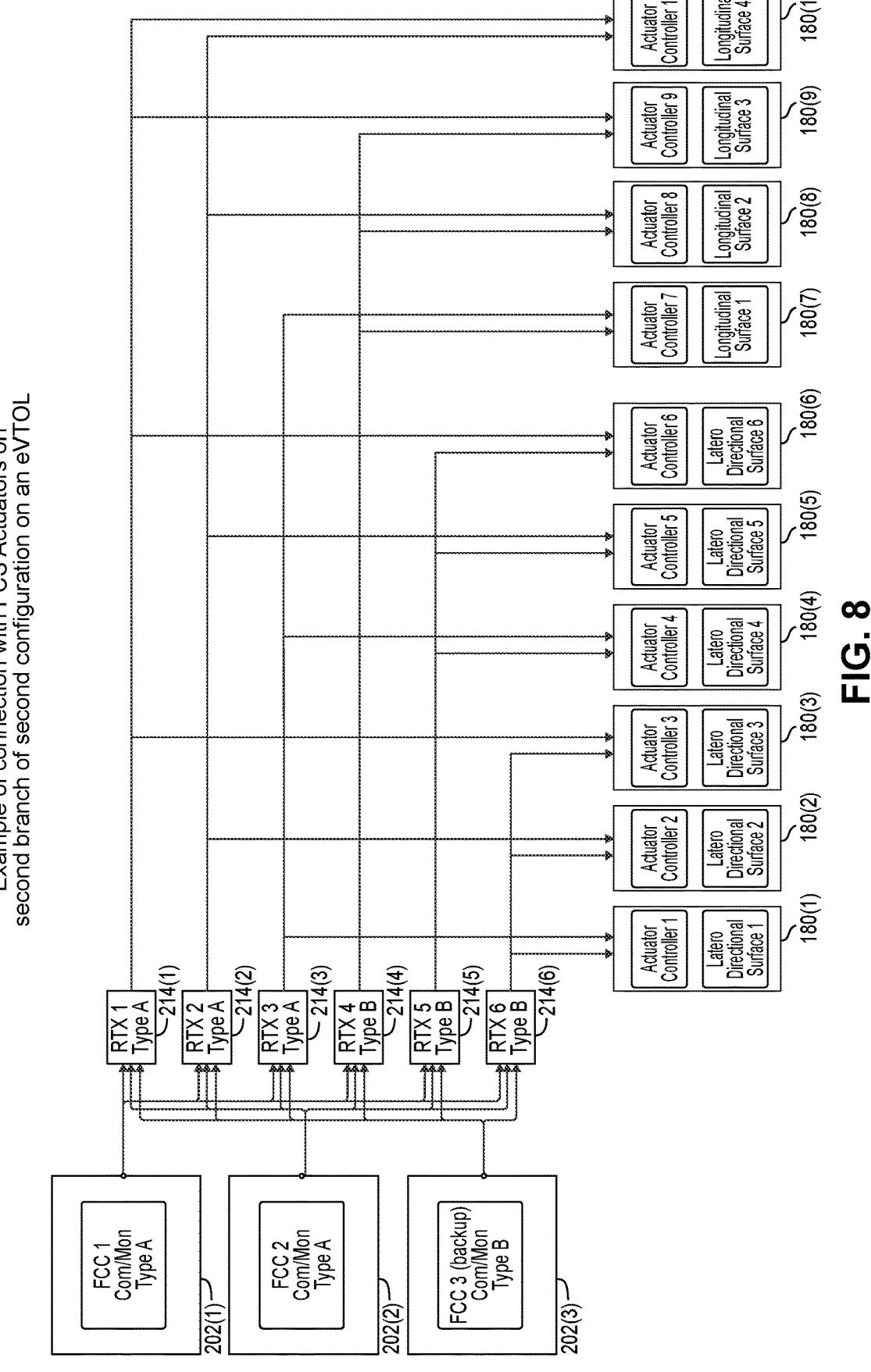
FIG. 8 shows an example of connection with FCS actuators on second branch of second configuration on an eVTOL.

FIGS. 7 & 8 show an example of use of the second branch of the second configuration for the eVTOL, where each controller of the effector actuation means or effector actuator is able to receive two sources of input, and each of the three FCCs 202 would be directly connected to two types of RTXs 214. The effector actuation means or effector actuator can be grouped into categories such as the category of lifters with eight elements 102(1)-102(8), the category of pushers with two elements 104(1), 104(2), the category of latero-directional actuators with six elements 180(1)-180(6) and the category of longitudinal actuators with four elements 180(7)-180(10). In this grouping, E which is the maximum number of controllers of the category with a greater number of elements is equal to eight. Considering m as the minimum number of RTXs 214 of a first type (in this example 214(1)-214(3)) and n as the minimum number of RTXs 214 of a second type (in this example 214(4)-214(6)), there are some possible combinations of m and n which make K greater than or equal to E, such as m=3 and n=3. Using this combination, each RTX 214 receives commands from the three FCCs 202 and each of the eight lifters 102 receive command from an exclusive combination of an RTX 214 of a first type and an RTX 214 of a second type. In case of loss of any two FCCs 202 or any two RTXs 214, no more than one lifter 102 would be lost.

FIG. 7 shows the connections from the three FCCs 202 to Motor Controllers in this example, each motor controller being connected to or part of a lifter motor that rotates a lifter 102 or pusher 104.

FIG. 8 shows the same three FCCs 202 of FIG. 7. FIG. 8 shows just the connection of the FCCs 202 with Flight Control System (FCS) actuators.

Example 3

Figure 9:
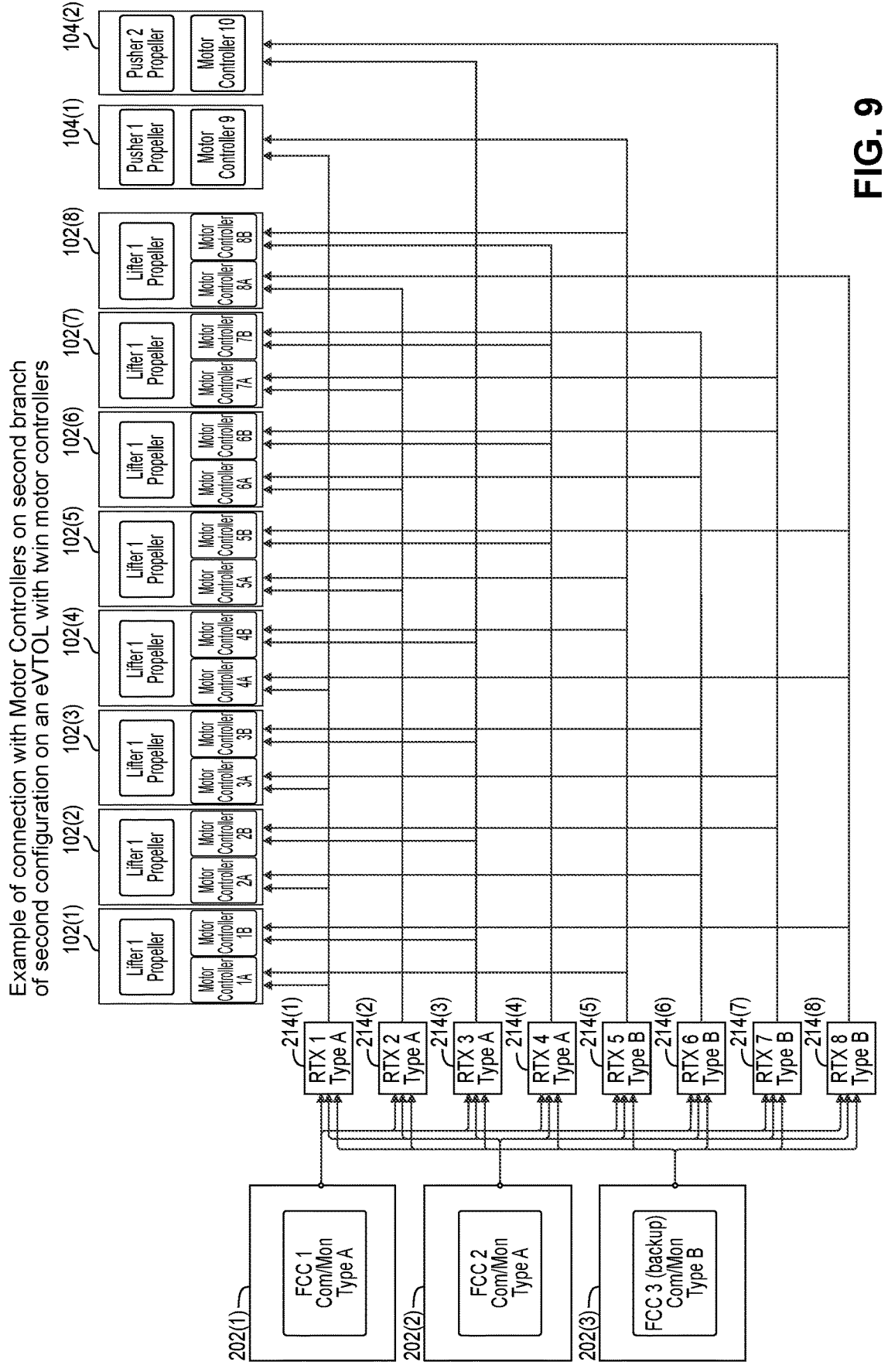
FIG. 9 shows an example of connection with Motor Controllers on second branch of second configuration on an eVTOL with twin motor controllers.

Depending on Safety Assessment results, to provide additional redundancy it may be necessary to provide more complexity to the vehicle architecture, such as using two motor controllers for each lifter 102. This architecture is shown in FIG. 9. In this case, the previous example would be modified to consider E=16. There are some possible combinations of m and n which make K greater than or equal to E, such as m=4 and n=4. Using this combination, each RTX receives commands from the three FCCs and each of the sixteen lifter motor controllers receive commands from an exclusive combination of an RTX of a first type and an RTX of a second type. In case of loss of any two FCCs or any two RTXs, no more than 1 lifter motor controller would be lost.

FIG. 9 shows the connections from the three FCCs 202 to the Motor Controllers in this example.

Figure 10:
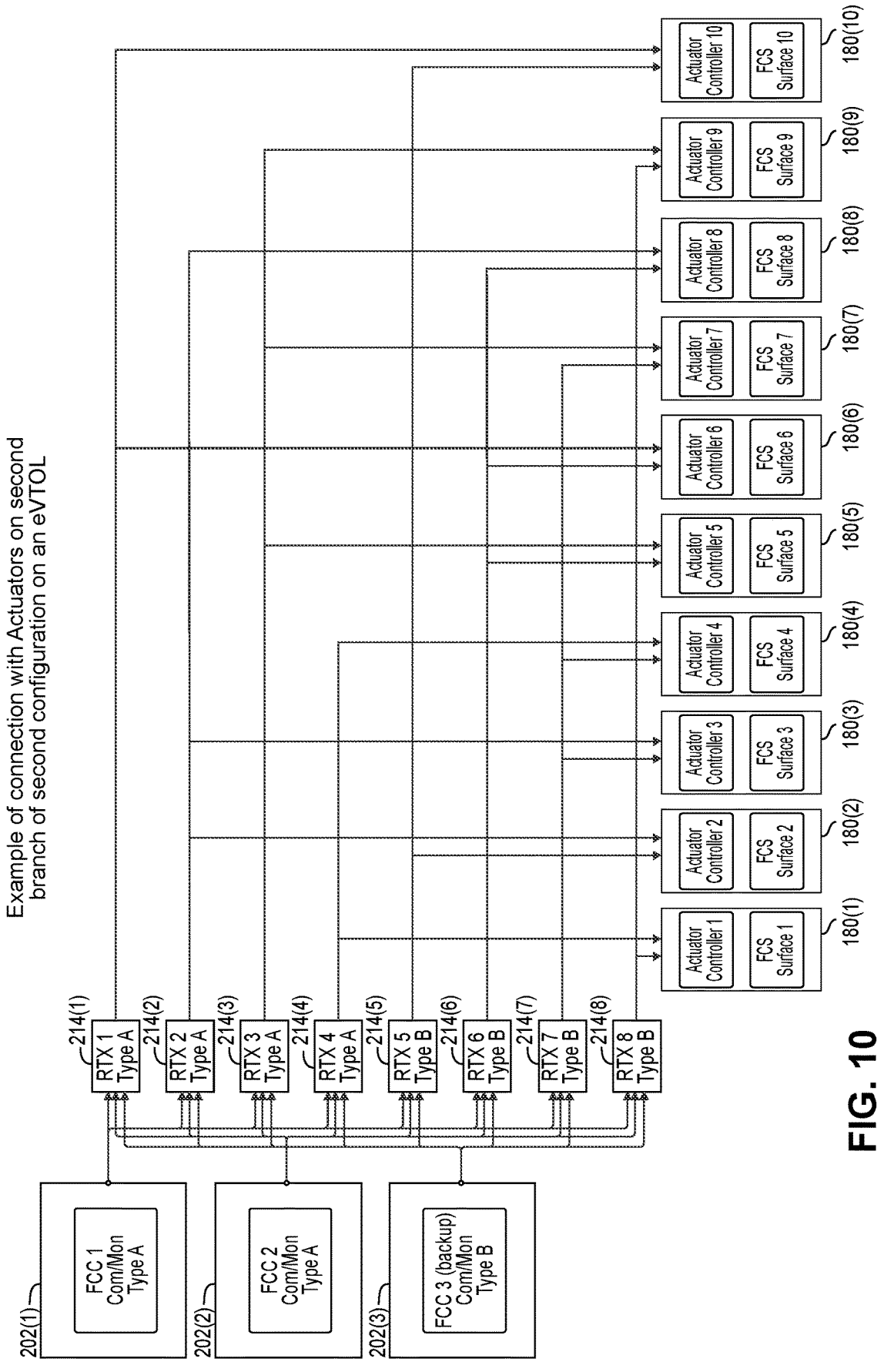
FIG. 10 shows an example of connection with Actuators on second branch of second configuration on an eVTOL.

FIG. 10 shows the same three FCCs of FIG. 9. FIG. 10 shows just the connection of the FCCs 202 with Flight Control System (FCS) actuators.

Example 4

Figure 11:
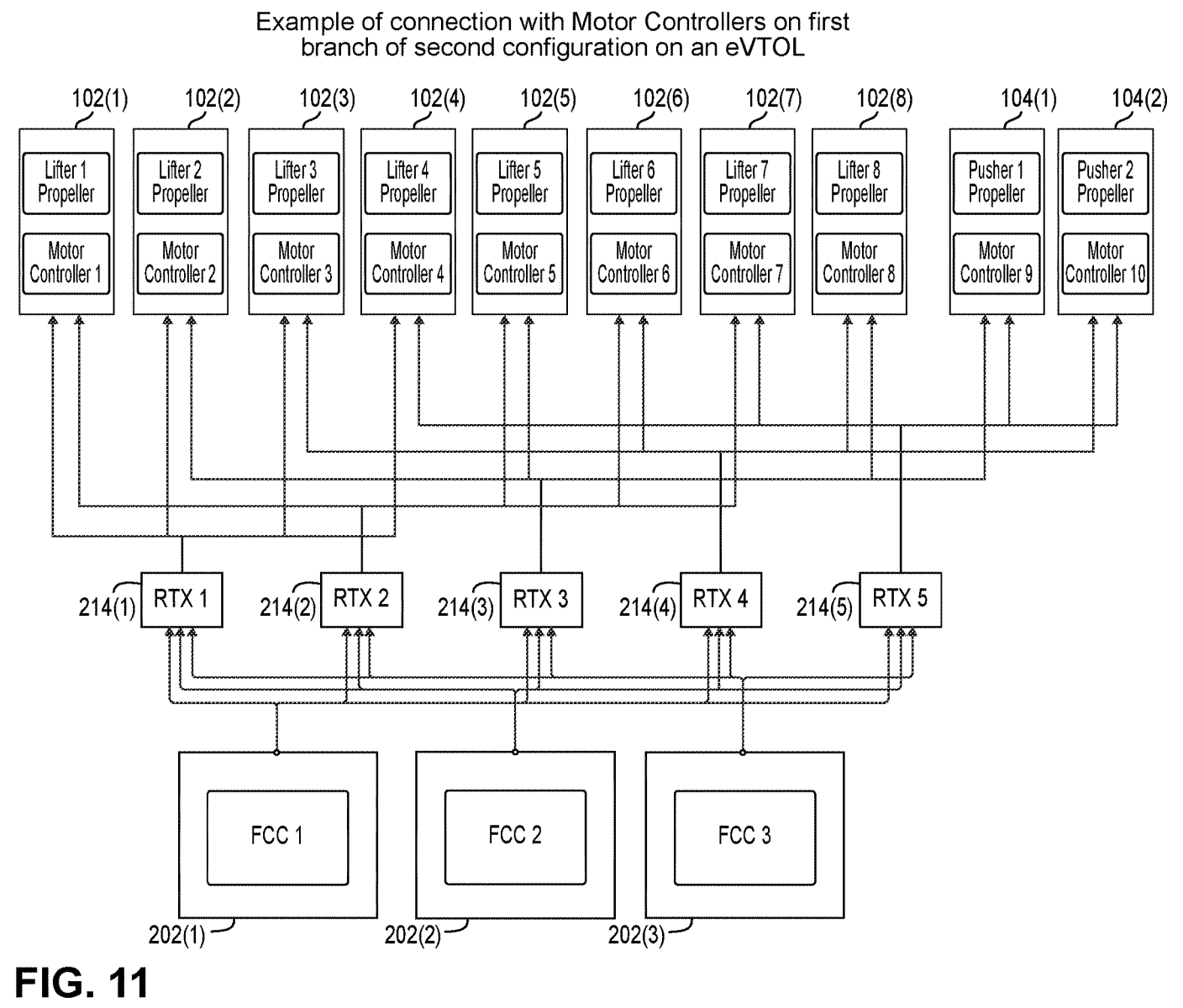
Figure 12:
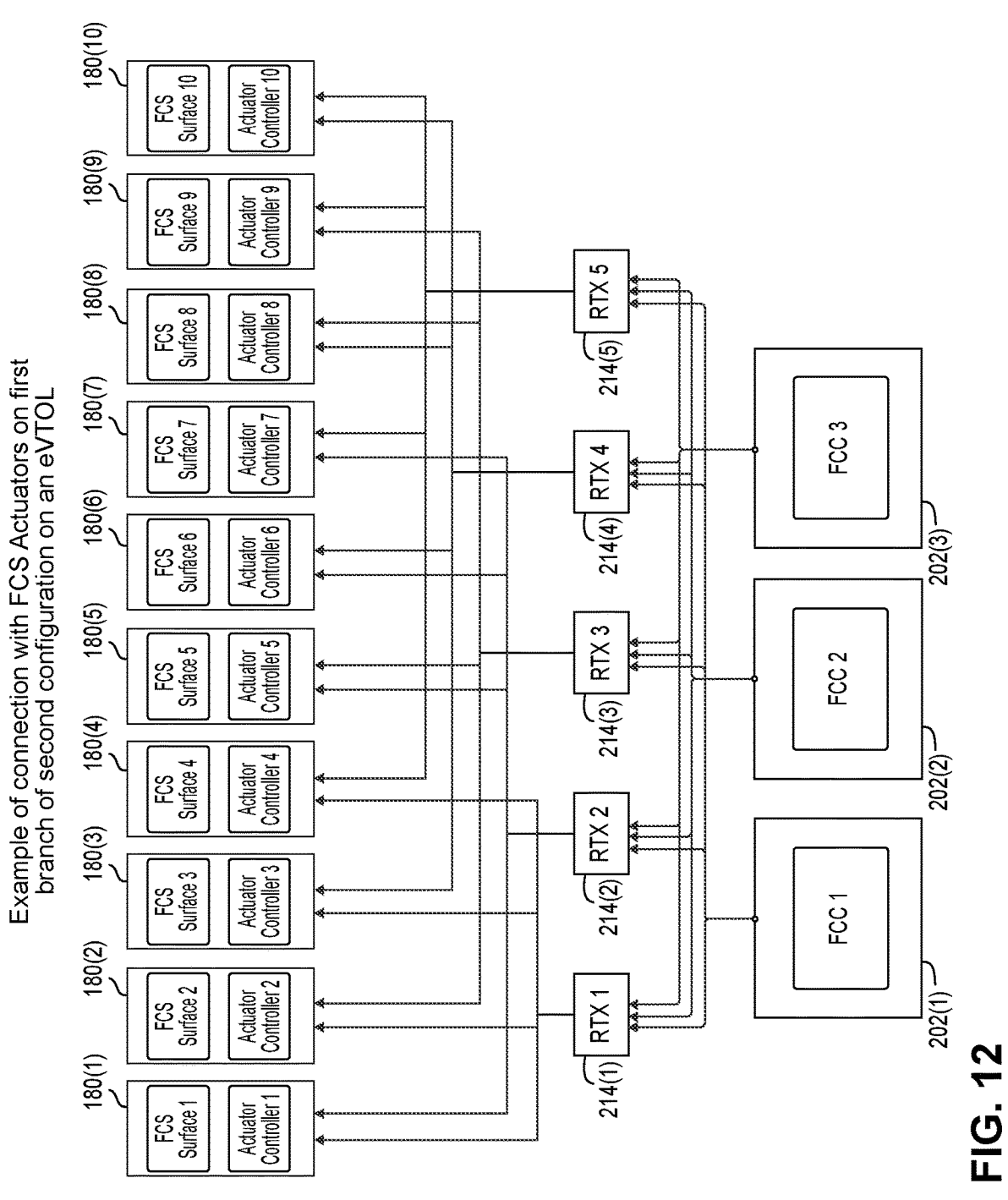
FIG. 12 shows an example of connection with FCS actuators on first branch of second configuration on an eVTOL.

FIGS. 11 and 12 show an example of use of the first branch of the second configuration for the eVTOL, where each controller of the effector actuation means or effector actuator is able to receive two sources of input, and each of the three FCCs 202 is directly connected to one type of RTX 214. The effector actuation means or effector actuator can be grouped into categories such as the category of motor controller of propellers with ten elements, the category of latero-directional actuator controllers with six elements and the category of longitudinal actuator controllers with four elements. In this grouping, E which is the maximum number of controllers of the category with greater number of elements, is equal to ten. Considering n as the minimum number of RTXs 214, five is the value of n that results in the minimum value of K such that K is greater than or equal to E. Using this combination, each RTX 214 receives commands from the three FCCs 202 and each of the ten motor controllers (see FIG. 9) receives commands from an exclusive combination of two RTXs. In case of loss of any two FCCs 202 or any two RTXs 214, no more than 1 propeller would be lost.

FIG. 11 shows the connections from the three FCCs 202 to the Motor Controllers in this example.

FIG. 12 shows the same three FCCs 202 of FIG. 11. FIG. 12 shows just the connection of the FCCs 202 with Flight Control System (FCS) actuators for effectors 180.

Example 5 (Hybrid)

Figure 13:
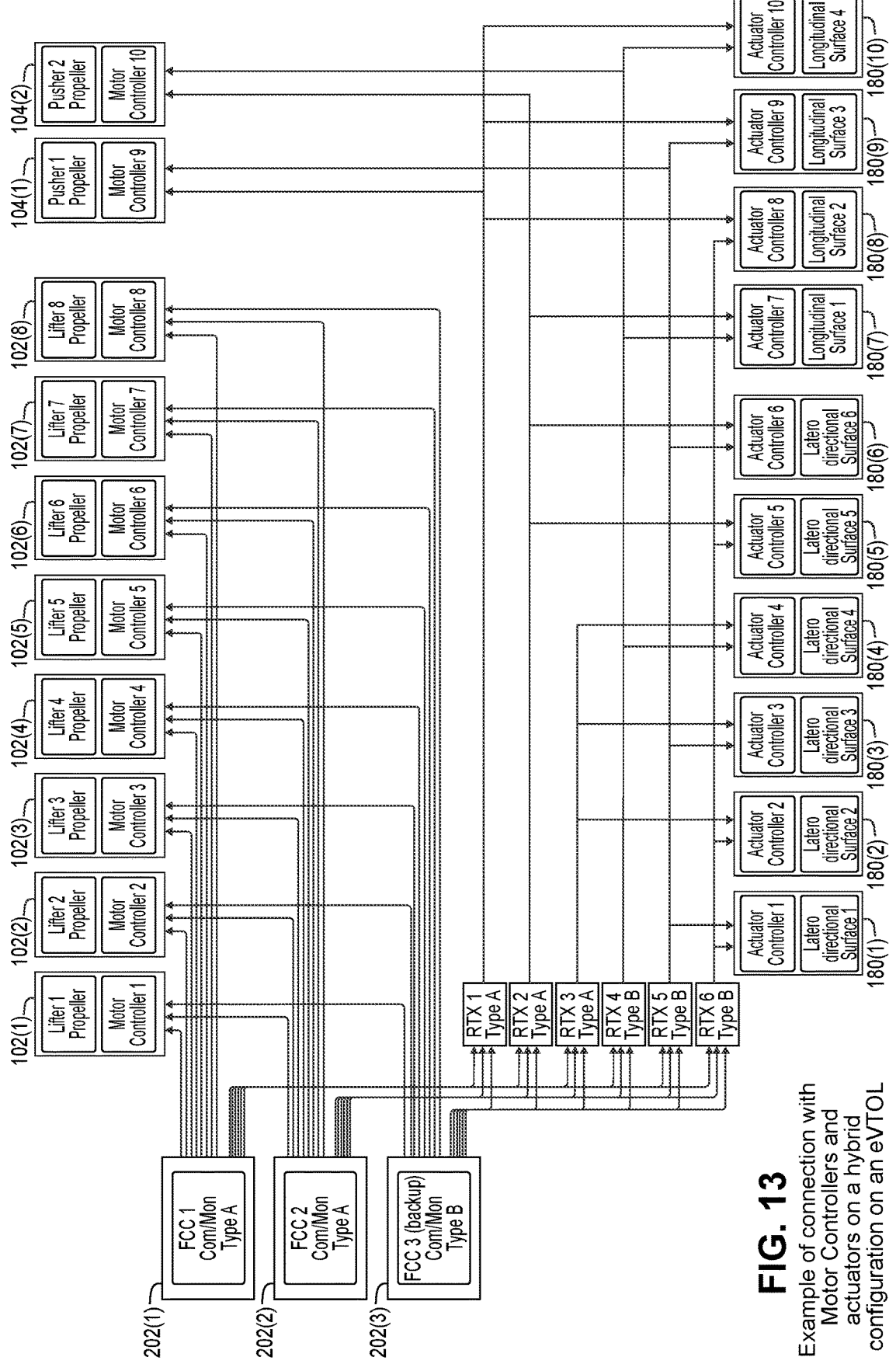
FIG. 13 shows an example of connection with Motor Controllers and actuators on a hybrid configuration on an eVTOL.

FIG. 13 show another example which uses a hybrid configuration. If either the motor controllers of the lifter propellers 102 receive three sources of command and the actuators and pusher 104 motor controllers receive two sources of command, each lifter motor controller can receive commands directly from each of the three FCCs 202, and each of the actuator and pusher motor controllers can receive commands indirectly via the RTXs 214, as already presented in previous examples.

Alternatively, such hybrid configuration may be used if the actuators receive three sources of commands and the motor controllers receive two sources of commands, or in any other possible combination of different types of motor controllers and actuators, receiving different number of inputs.

FIG. 13 thus shows an example of a possible hybrid configuration. This configuration has the advantage of a direct link to reduce the delay of commands from FCCs 202 to the lifter 102 motor controllers, which improves vehicle controllability. It allows high availability on controllers that just receive commands from two sources. It also reduces the number of outputs from each FCC 202 as the RTXs 214 take care of the retransmission to the actuators and pusher 104 motor controllers.

The controllers that receive inputs from two sources can be grouped into categories such as the category of pushers 104 with two elements, the category of latero-directional actuators 180 with six elements and the category of longitudinal actuators 180 with four elements. In this grouping, E (which is the maximum number of controllers of the category with the greater number of elements) is equal to six. Considering m as the minimum number of RTXs 214 of a first type and n as the minimum number of RTXs 214 of a second type, there are some possible combinations of m and n which make K greater than or equal to E, such as m=2 and n=3 for a total of five RTXs 214(1)-214(5). But another example embodiment shown in FIG. 13 uses 3 RTXs 214 (1)-214(3) of type A and 3 RTXs 214(4)-214(6) of type B to achieve a symmetric distribution of LRUs.

Example 6

Figure 14:
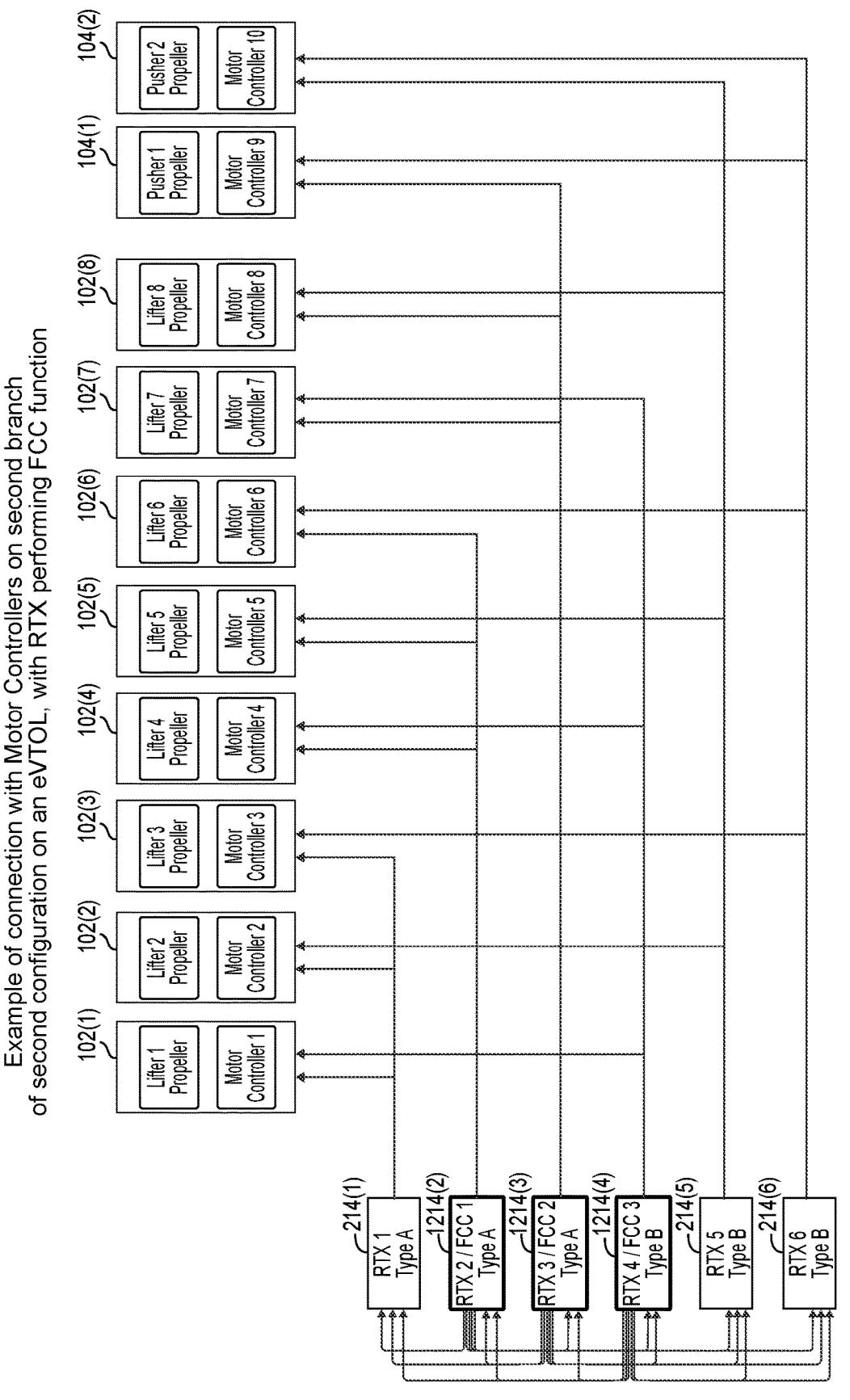
FIG. 14 shows an example of connection with Motor Controllers on second branch of second configuration on an eVTOL, with RTX performing FCC function.
Figure 15:
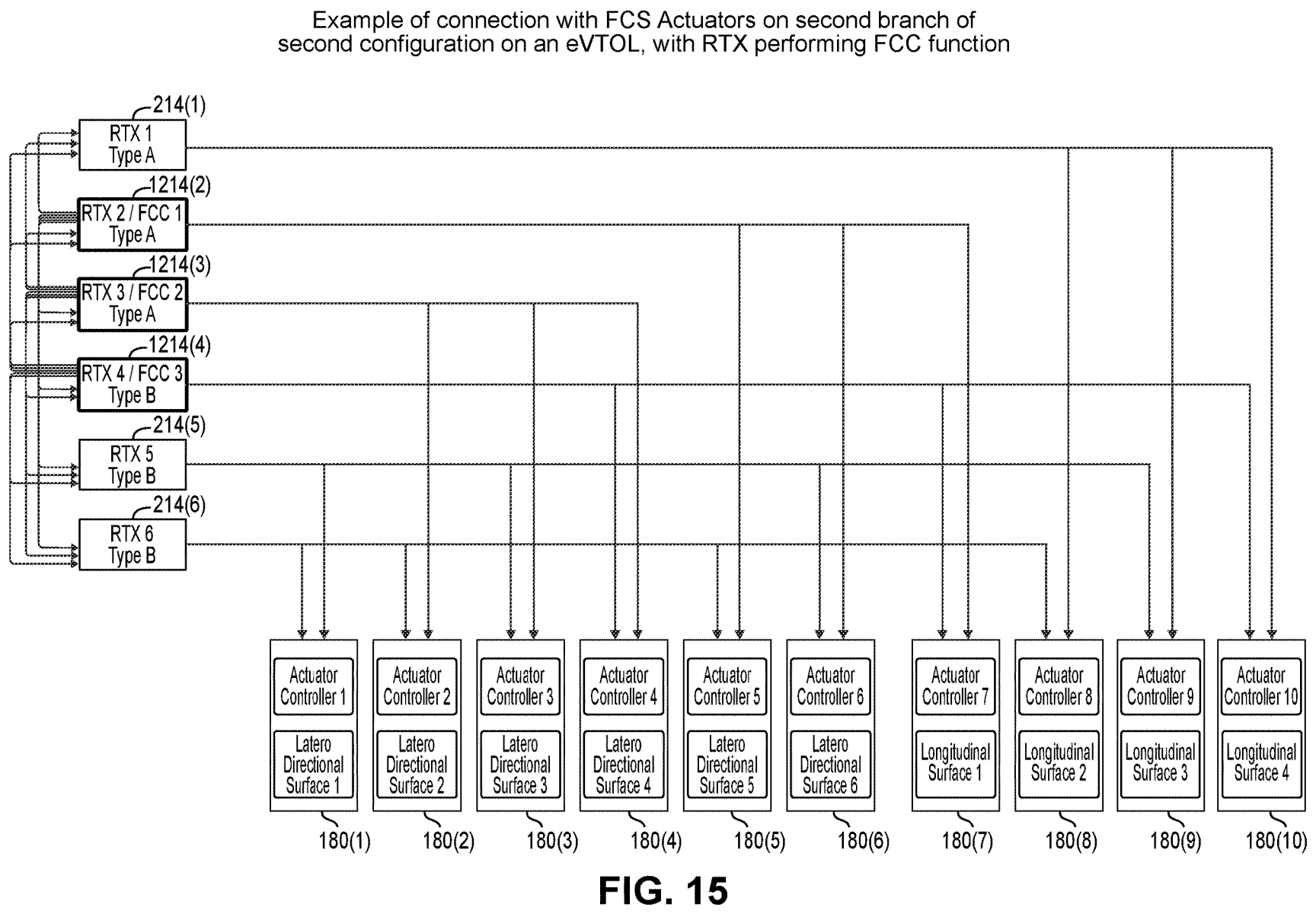

FIGS. 14 & 15 show another example based on example 2, where some of the RTXs 1214 can perform the function of an FCC 202 (i.e. acting as a combined RTX and FCC providing functions of each), therefore reducing the number of LRUs. This example uses the second branch of the second configuration for an eVTOL. Refer to example 2 for more details on the number of RTXs 214 of example 6.

FIG. 14 shows the connections from the three RTX/FCCs 1214 to the Motor Controllers in this example.

FIG. 15 shows the same three RTX/FCCs 1214 of FIG. 14. FIG. 15 shows just the connection of the RTX/FCCs 1214 with Flight Control System (FCS) actuators.

Example 7

Figure 17:
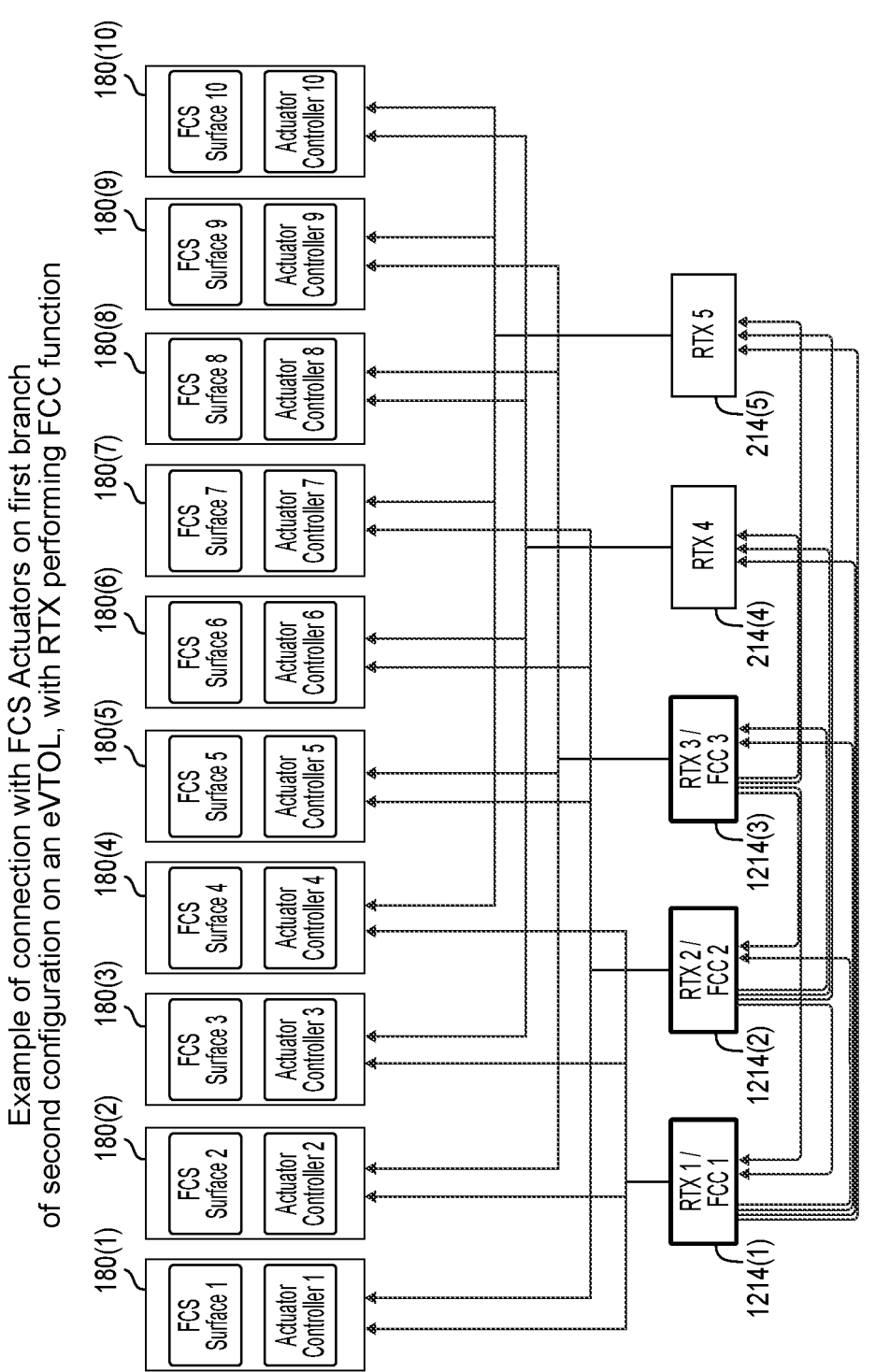
FIG. 17 shows an example of connection with FCS actuators on first branch of second configuration on an eVTOL, with RTX performing FCC function.

FIGS. 16 and 17 show another example based on example 4, in which some of the RTXs 1214 can perform the function of an FCC 202 (i.e. acting as a combined RTX and FCC providing functions of each) therefore reducing the number of LRUs. This example uses the first branch of the second configuration for the eVTOL. Refer to example 4 for more details on the number of RTXs of example 7.

FIG. 16 shows the connections from the three RTX/FCCs 1214 to the Motor Controllers 102, 104 in this example.

FIG. 17 shows the same three RTX/FCCs 1214 of FIG. 16. FIG. 17 shows just the connection of the RTX/FCCs 1214 with Flight Control System (FCS) actuators 180.

Example 8 (Hybrid)

Figure 18:
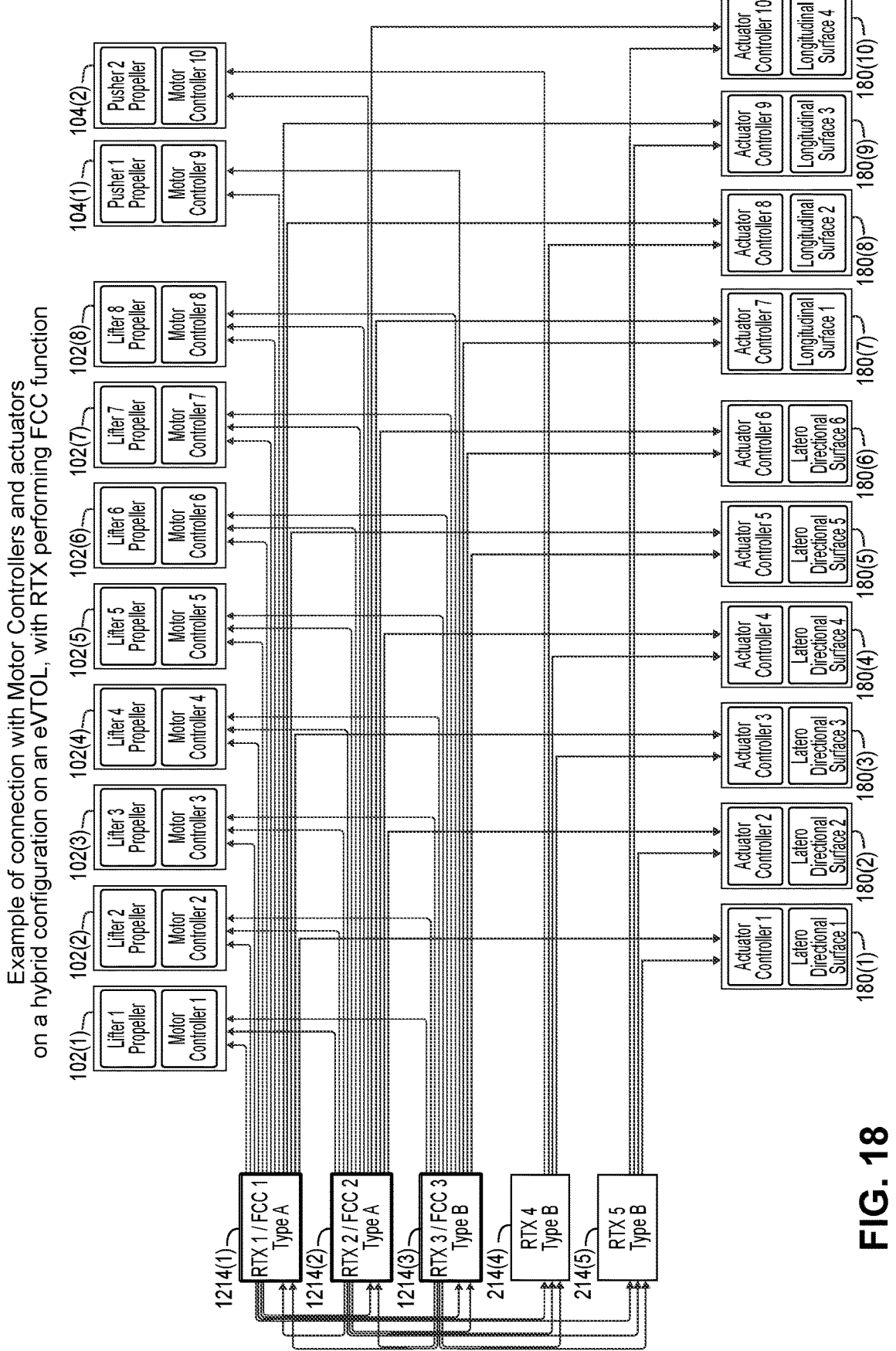
FIG. 18 shows an example of connection with Motor Controllers and actuators on a hybrid configuration on an eVTOL, with RTX performing FCC function.

FIG. 18 shows a hybrid configuration that may be used in which some of the RTXs 1214 can perform the function of an FCC 202 as well as the function of an RTX, therefore reducing the number of LRUs. If the motor controllers of the lifter propellers 102 receive three sources of command and/or the actuators and pusher 104 motor controllers receive two sources of command, each lifter motor controller can receive commands directly from each of the three RTX/FCCs 202, and each of the actuator and pusher motor controller can receive commands indirectly via the RTXs 214, as already presented on previous examples.

Alternatively, such hybrid configuration may be used if the actuators receive three sources of command and the motor controllers receive two sources of command, or in any other possible combination of different types of motor controllers and actuators, receiving different numbers of inputs.

FIG. 18 thus shows an example of a possible hybrid configuration. This configuration has the advantage of a direct link to reduce the delay of commands from RTX/FCCs 1214 to the lifter 102 motor controllers, which improves vehicle controllability. It allows high availability on controllers that receive command from just two sources. It also reduces the number of outputs from each RTX/FCC 1214 as the RTXs 214 take care of the retransmission to the effector actuators and pusher motor controllers.

The controllers that receive inputs from two sources can be grouped into categories such as the category of pushers 104(1)-102(2) with two elements, the category of latero-directional actuators 180(1)-180(6) with six elements and the category of longitudinal actuators 180(7)-180(10) with four elements. In this grouping, E (which is the maximum number of controllers of the category with the greater number of elements) is equal to six. Considering m as the minimum number of RTXs 214 of a first type and n as the minimum number of RTXs 214 of a second type (whether or not combined with FCCs, since in this embodiment RTX/FCCs 1214(1) and 1214(2) are combined FCCs with RTXs of a Type A, and RTX/FCC 1214(3) is a combined FCC with an RTX of a different Type B), there are some possible combinations of m and n which make K greater than or equal to E, such as m=2 and n=3.

15

Example 9 (Inceptors)

Figure 19:
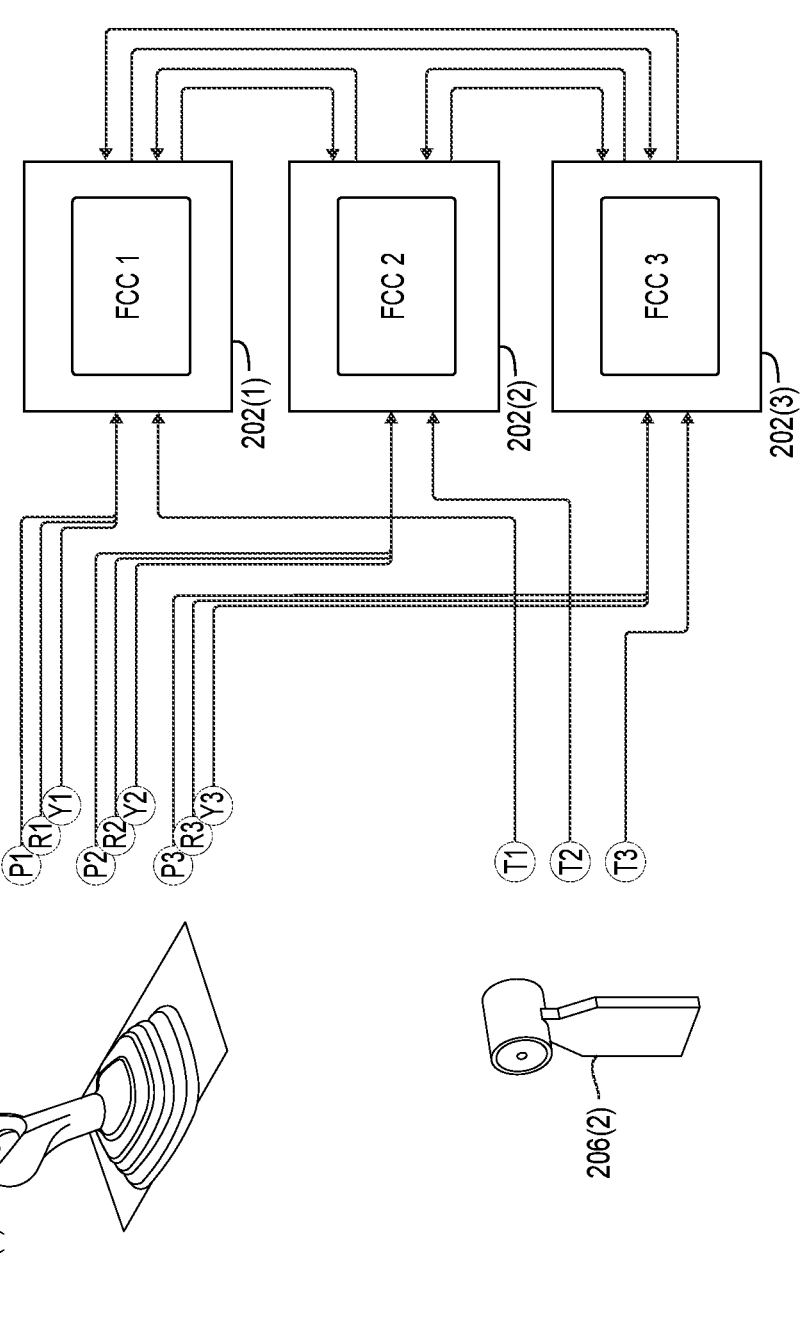
FIG. 19 shows an example of direct connection of inceptors and FCCs.

Besides the examples of connection with the effectors, the links with the flight deck inceptors is also presented here and shown in FIG. 19.

In this example, each FCC 202 is directly connected to one sensor of each axis of control of flight deck inceptors 206. The figure shows two inceptors 206(1), 206(2) to control the axes of Pitch, Roll, Yaw and Throttle, each axis having three sensors. The FCCs 202 read the information from their respective set of inceptor sensors 206 and retransmit to the other FCCs 202.

In this example, the three FCCs 202 may be of the same type, or each one may be of a different type. They may have a single lane or dual lane in a Command/Monitor FCC 202 configuration.

Example 10 (Inceptors)

Figure 20:
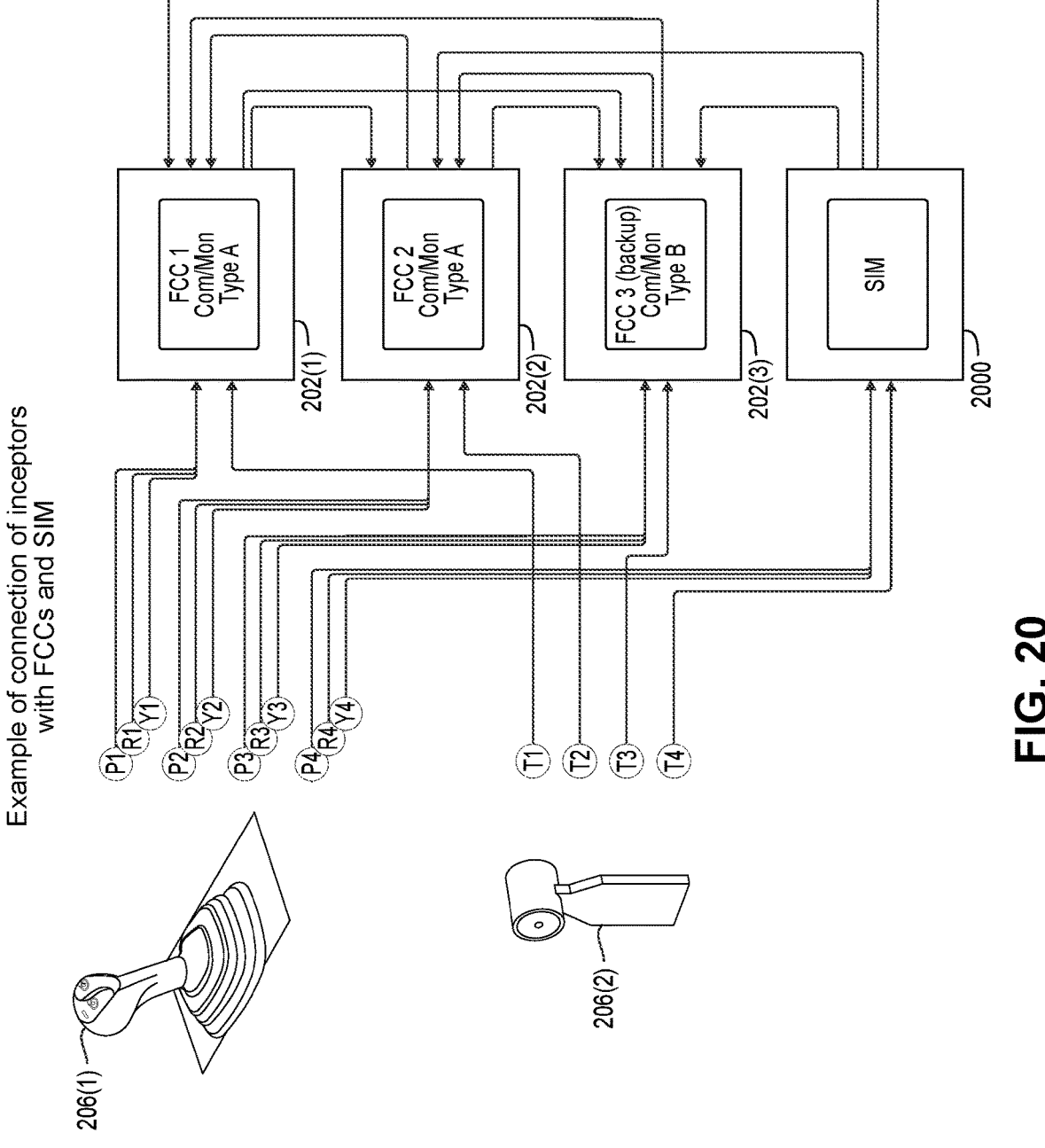
FIG. 20 shows an example of connection of inceptors with FCCs and SIM.

Another example of connection with the flight deck inceptors is shown in FIG. 20.

The figure shows two inceptors 206(2), 206(4) to control the axes of Pitch, Roll, Yaw and Throttle, each axis having four sensors.

In this example, each FCC 202 is directly connected to one sensor of each axis of control of flight deck inceptors 206. There are two types of FCC 202 which are dissimilar: type A and type B. Each FCC 202 is of a traditional Command/Monitor lanes architecture. There is also one Sensor Interface Module (SIM) 2000 to read the fourth set of sensors of the inceptors 206. The FCCs 202 and the SIM 2000 read the information from their respective set of inceptor sensors 206 and retransmit to the other FCCs 202.

Besides what is presented in these examples, there may be more SIMs 2000 to perform the function of reading sensors and retransmitting to the FCCs 202.

Example 11 (Relays and Contactors)

Besides examples of connection with the effectors and flight deck inceptors 206, there is also the possibility to include relays or contactors 212 in the architecture to disengage specific actuators and/or motor controllers in case of misbehavior. In this context, relays and contactors may comprise electromechanical devices that comprise electromagnetic coils that when energized and deenergized cause an armature or the like to move and thus cause electrical contacts to make or break electrical connections, and may also include so-called "semiconductor" or "solid state" or opto-isolated relays or contactors which use triacs or FETs to make or break electrical connections, or other devices having the same or similar functionality. Such devices are often used to switch high current and/or high power while isolating digital systems such as FCCs 202 from such high current and/or power.

In this example, each FCC 202 is directly connected to the control inputs of relays and contactors 212. The relays 212R are responsible for energizing or de-energizing the actuators. The contactors 212C are responsible for energizing or de-energizing the motor controllers. The relays and/or contactors 212 can be standalone LRUs or can be grouped in some LRUs. Each relay 212R energizes an effector actuator if at least one FCC 202 commands energization. The contactor 214C energizes the motor controller if at least one FCC commands energization.

In this example, the three FCCs 202 may be of the same type, or each one may be of a different type. They may have a single lane or dual lane in a Command/Monitor FCC 202 configuration.

FIG. 21 shows the connections from the three FCCs 202 to one of the contactors 212C.

Figure 22:
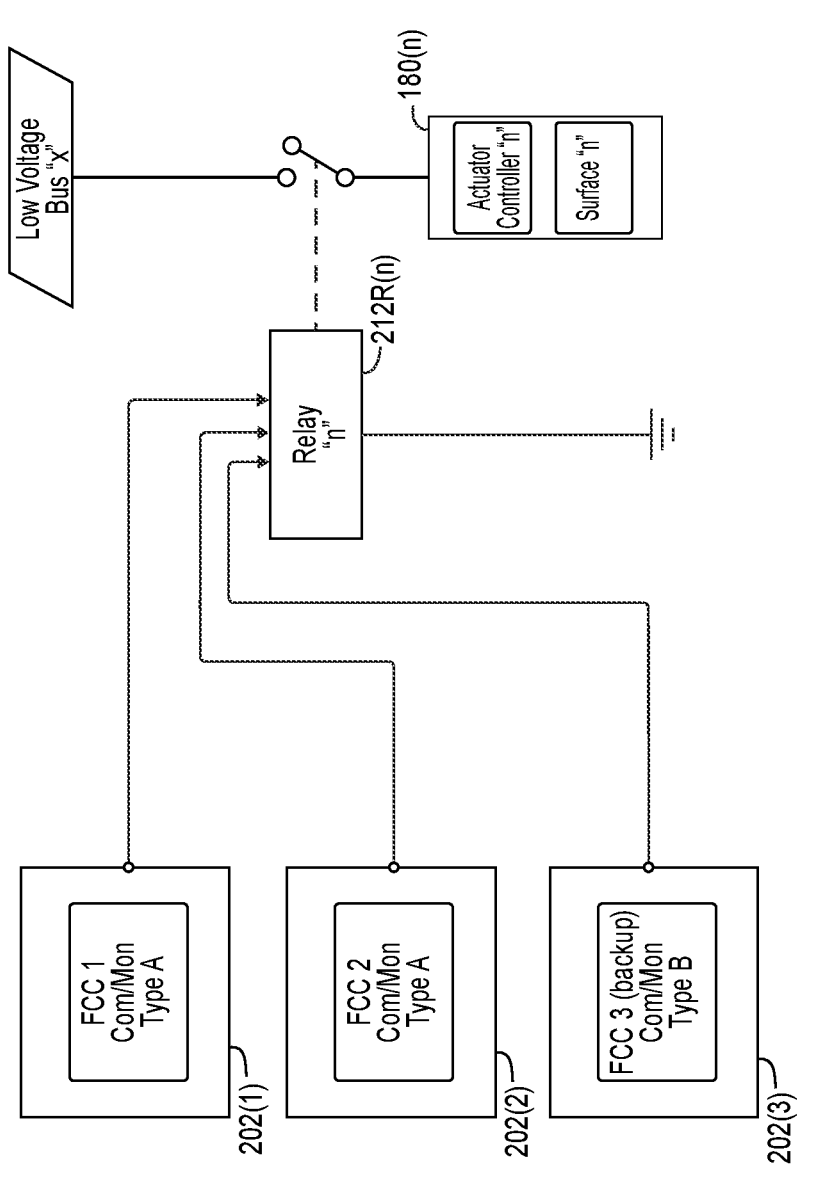
FIG. 22 shows an example of connection of relays with FCCs.

FIG. 22 shows the same three FCCs 202 of FIG. 21. FIG. 22 shows just the connection of the FCCs 202 with one of the relays.

Example 12 (Relays and Contactors)

Besides examples of connection with the effectors and flight deck inceptors, there is also the possibility to include relays or contactors 214 in the architecture to disengage specific actuators and/or motor controllers in case of misbehavior.

In this example, each FCC 202 is connected to the relays and contactors 212 via RTXs 214. The relays 212R are responsible for energizing or de-energizing the actuators. The contactors 212C are responsible for energizing or de-energizing the motor controllers. The relays and/or contactors 212 can be standalone LRUs or can be grouped in some LRUs. The relay 212R energizes the actuator if at least one RTX 214 commands energization. The contactor 212C energizes the motor controller if at least one RTX 214 commands energization.

In this example, the three FCCs 202 may be of the same type, or each one may be of a different type. They may have a single lane or dual lane in a Command/Monitor FCC 202 configuration. Also, the RTXs 214 may be of the same type, or of different types.

Figure 23:
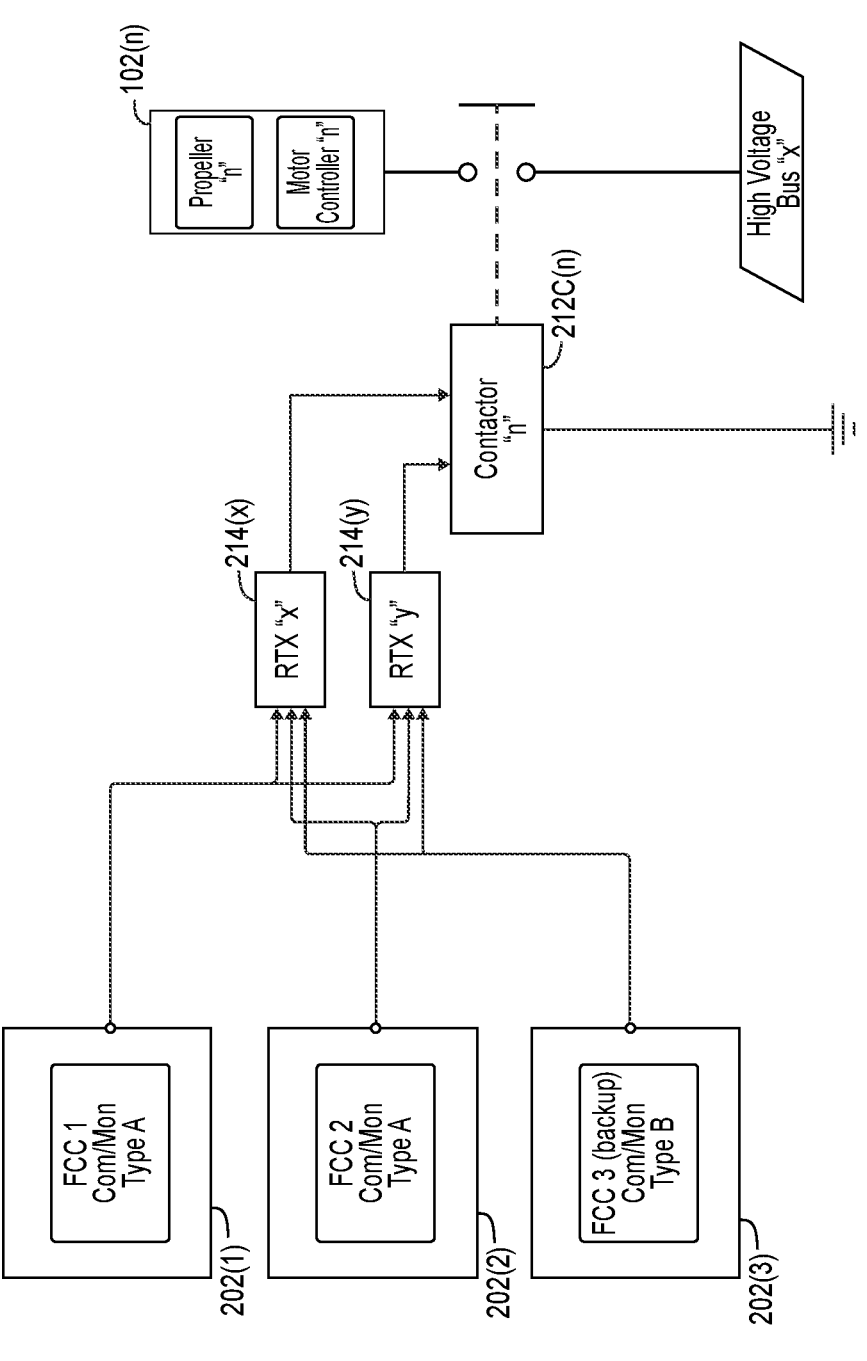
FIG. 23 shows an example of connection of contactors with FCCs via RTXs.

FIG. 23 shows the connections from the three FCCs 202 to one of the contactors via RTXs 214.

Figure 24:
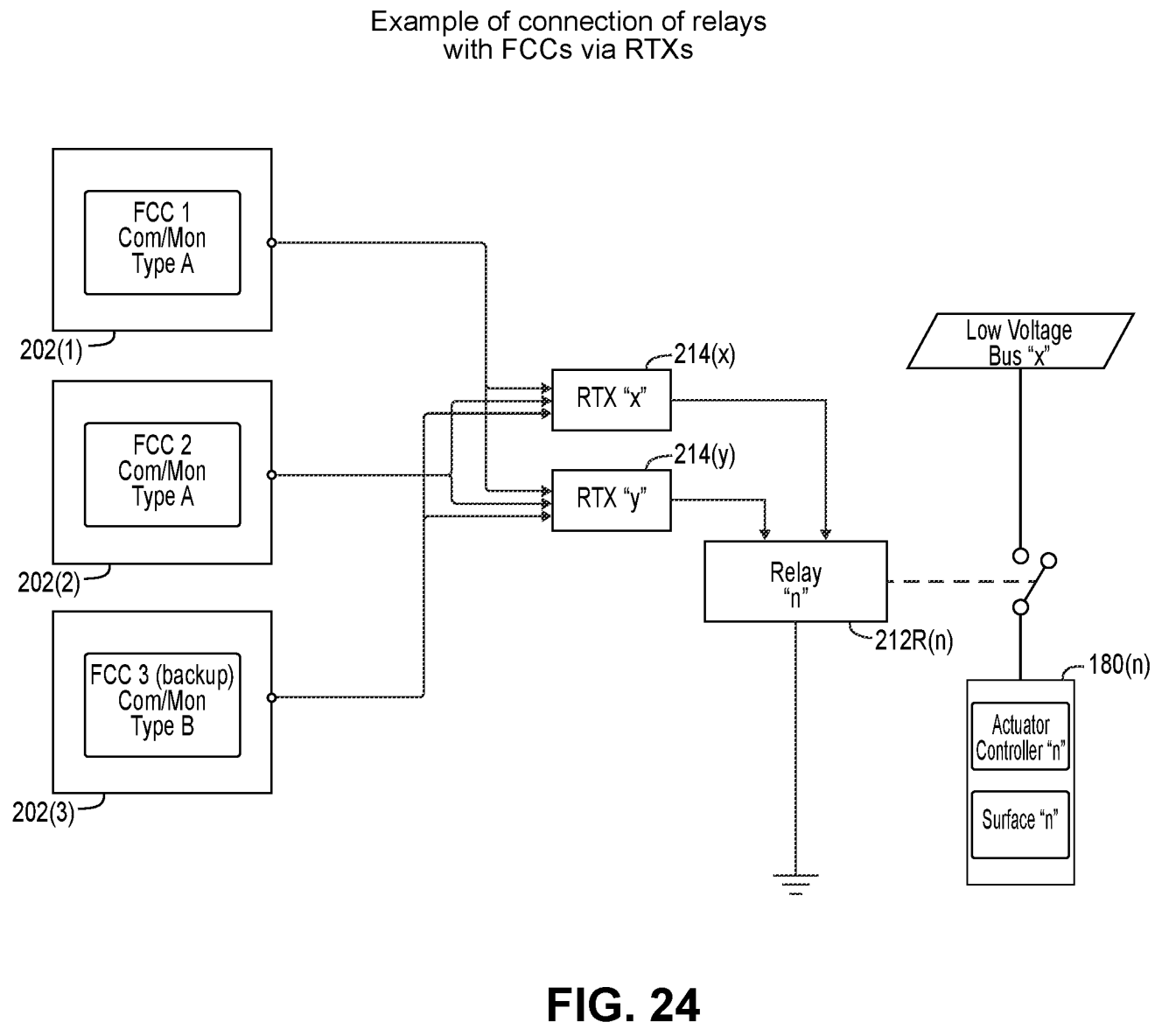

FIG. 24 shows the same three FCCs 202 of FIG. 23. FIG. 24 shows just the connection of the FCCs with one of the relays via RTXs.

Example Non-Limiting Control Functions

FIGS. 25-30 show example control functions that the systems described above may perform. These control functions may be performed by executing software and/or by executing firmware and/or performed by hardware circuits.

Figure 25:
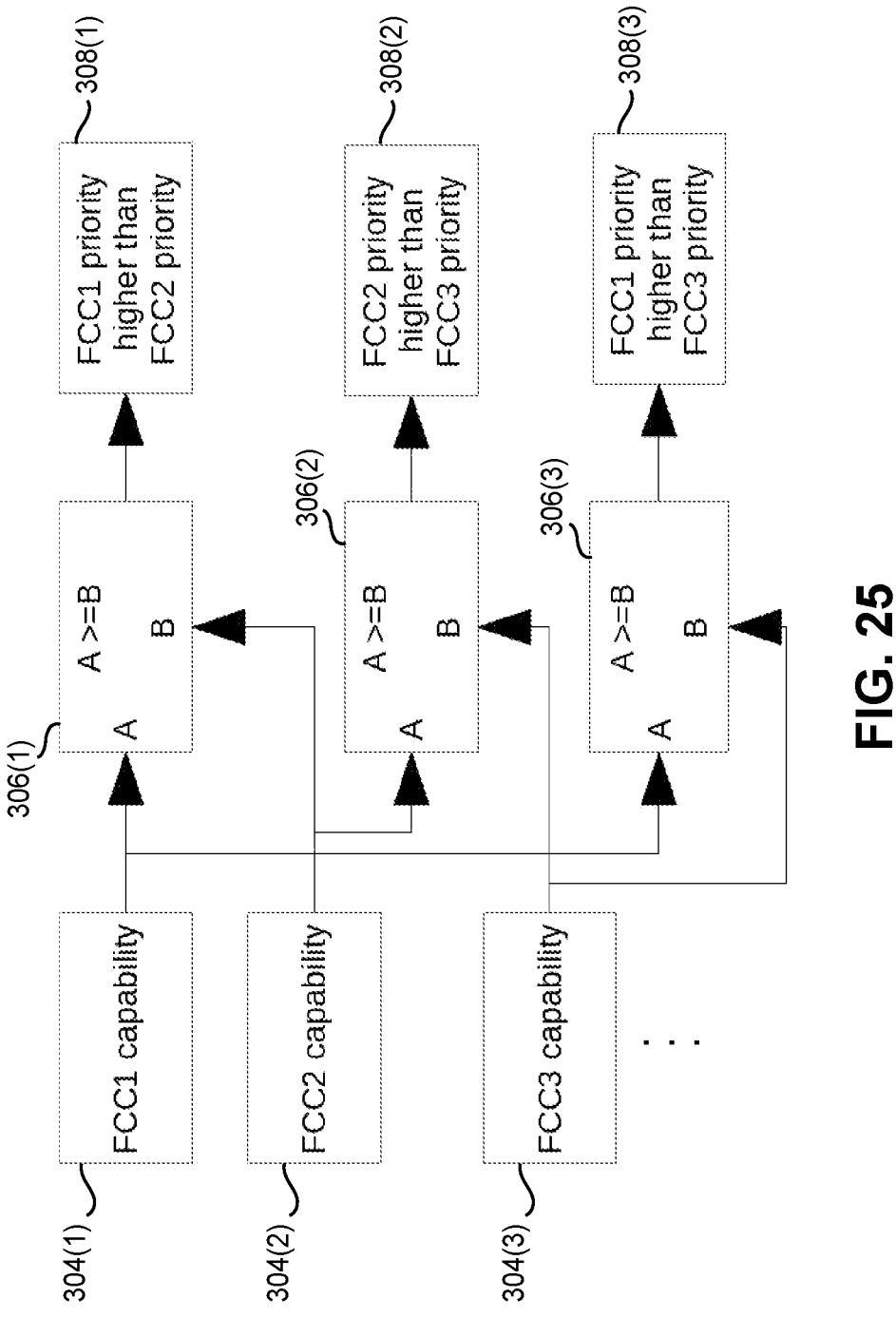
FIG. 25 shows an example of FCC output command selection/arbitration.

FIG. 25 is a block logic diagram showing an example priority decision function 302. In the example shown, there are three flight control computer capabilities that may be performed by different flight control computers 202. For example, a first flight control computer 202(1) may provide a first flight control computer capability 304(1), a second flight control computer 202(2) may provide a second flight control computer capability 304(2), and a third flight control computer 202(3) may provide a third flight control computer capability 304(3). In some embodiments, these three flight control computer capabilities 304(1), 304(2), 304(3), may be provided by the same flight control computer 202, or they may be provided by different flight control computers.

Priority calculators 306(1), 306(2), and 306(3) may determine and decide which flight control computer capability 304 has priority over which other flight control computer capability. For example, priority calculator 306(1) may receive as an input A the flight control computer capability 304(1) and as input B the flight control computer capability 304(2) (i.e., "FCC1 capability" and "FCC2 capability"), and in response, determine which flight control computer capability has priority. In the example shown, the first flight control computer capability FCC1 304(1) has priority higher than the second flight control computer capability FCC2 304(2). The priority calculator 306(1) thus provides an output 308(1) that gives the first flight control computer capability FCC1 304(1) a higher priority than the second flight control computer capability FCC2 304(2). For example, if both flight control computer capabilities FCC1 and FCC2 are present and active, the priority calculator 306(1) may act as a multiplexer to select the first flight control computer capability FCC1 (304(1)) instead of or over the second flight control computer capability FCC2 (304(2)). On the other hand, if the first flight control computer capability FCC1 is not present or active, then the priority calculator 306(1) may act as a multiplexer to select the second flight control computer capability FCC2 for output to 308(1). In this way, the priority calculator 306(1) prevents inconsistent control outputs or contradictory control outputs by selecting only one of its two flight control computer capabilities when both of the flight control computer capabilities FCC1, FCC2 are active and present.

FIG. 25 further shows a second priority calculator 306(2) that receives inputs from the second flight control computer capability FCC2 (304(2)) at an "A" input and a third flight control computer capability FCC3 (304(3)) at a "B" input. The priority calculator 306(2) gives a higher priority to the second flight control computer capability FCC2 (304(2)) then the third flight control computer capability FCC3 (304(3)) when both the second and third flight control computer capabilities are present and active.

FIG. 25 further shows a third priority calculator 306(3) connected to receive the first flight control computer capability FCC1 (304(1)) on its "A" input and the third flight control computer capability FCC3 (304(3)) on its "B" input. The third priority calculator 306(3) gives the first flight control computer capability FCC1 a priority higher than the third flight control computer capability FCC3 when both of these flight control computer capabilities are active and present, thereby preventing conflicting or contradictory results when or if the outputs of the different flight control computer capabilities are active.

While three flight control computer capabilities 304(1), 304(2), 304(3) are shown in FIG. 25, there may be any number of flight control computer capabilities (as indicated by the ellipses) and any number of priority calculators 306. Furthermore, the priority calculators 306 may accept any number of inputs and perform any of a variety of priority determining calculations, computations or logic functions in order to select one or the other of its inputs or even to combine inputs together or parts of inputs together in order to reflect a priority determination that avoids conflict and contradictory results.

Figure 26:
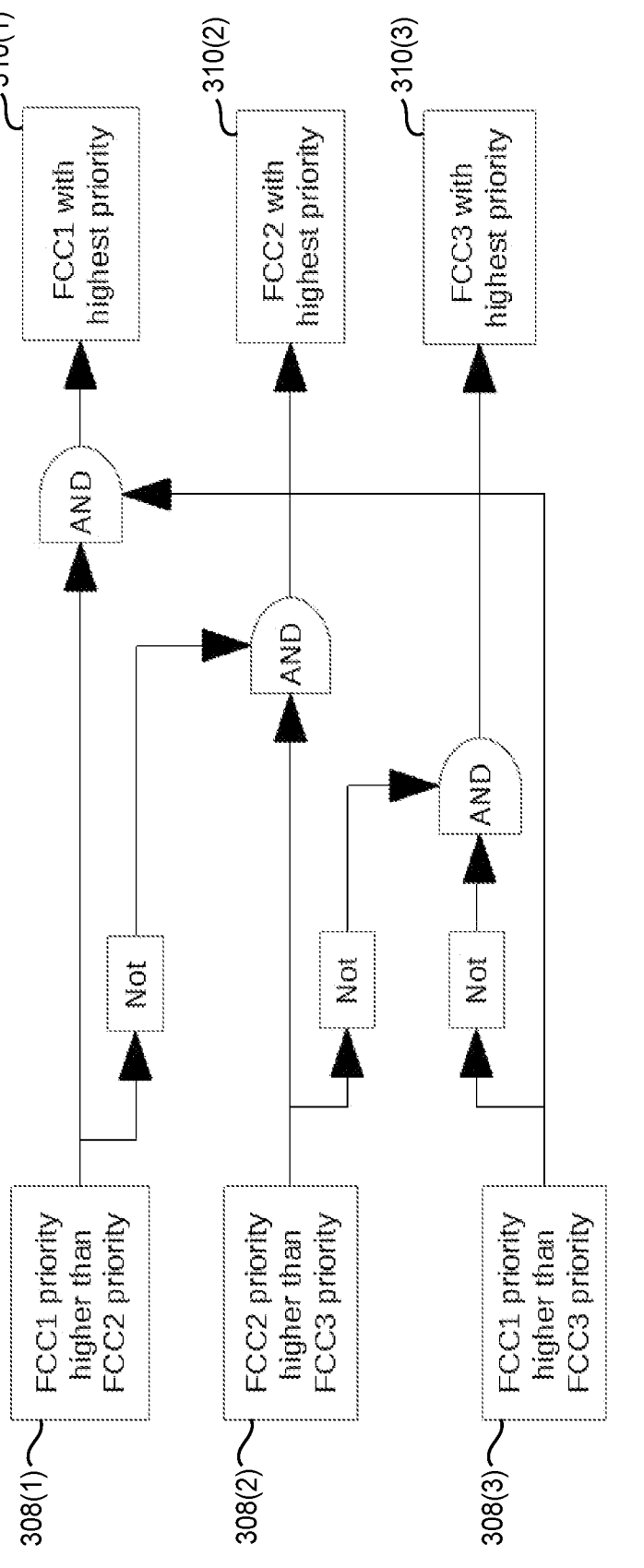
FIG. 26 shows another example of FCC output command selection/arbitration.

For example, FIG. 26 shows a further logic function diagram that combines the priority decision outputs 308(1), 308(2), 308(3) using example boolean logic functions or circuits such as two-input AND, OR and NOT (inverter) (or in some cases NAND and NOR). In the example shown, if FCC1 priority higher than FCC2 priority is true and FCC1 priority higher than FCC3 priority is true, the FIG. 26 logic circuit determines that FCC1 has the highest priority at 310(1). On the other hand, if FCC2 priority higher than FCC3 priority is true and FCC1 priority higher than FCC2 priority is false, then the FIG. 26 logic circuit determines that FCC2 has the highest priority at 310(2). Furthermore, if FCC1 priority higher than FCC3 priority is not true and FCC2 priority higher than FCC3 priority is also not true, then the FIG. 26 logic circuit determines that FCC3 has the highest priority at 310(3).

FIG. 26 is just an example of the type of boolean or other logic functions that may be performed. Other logic and/or mathematical functions could be used as well as 3, 4 or 5 or more input gates. Furthermore, while the FIG. 26 logic may be implemented using conventional logic gates and logic circuits, it might also be implemented by a state machine, a software or firmware program, or any other desired implementation.

Figure 27:
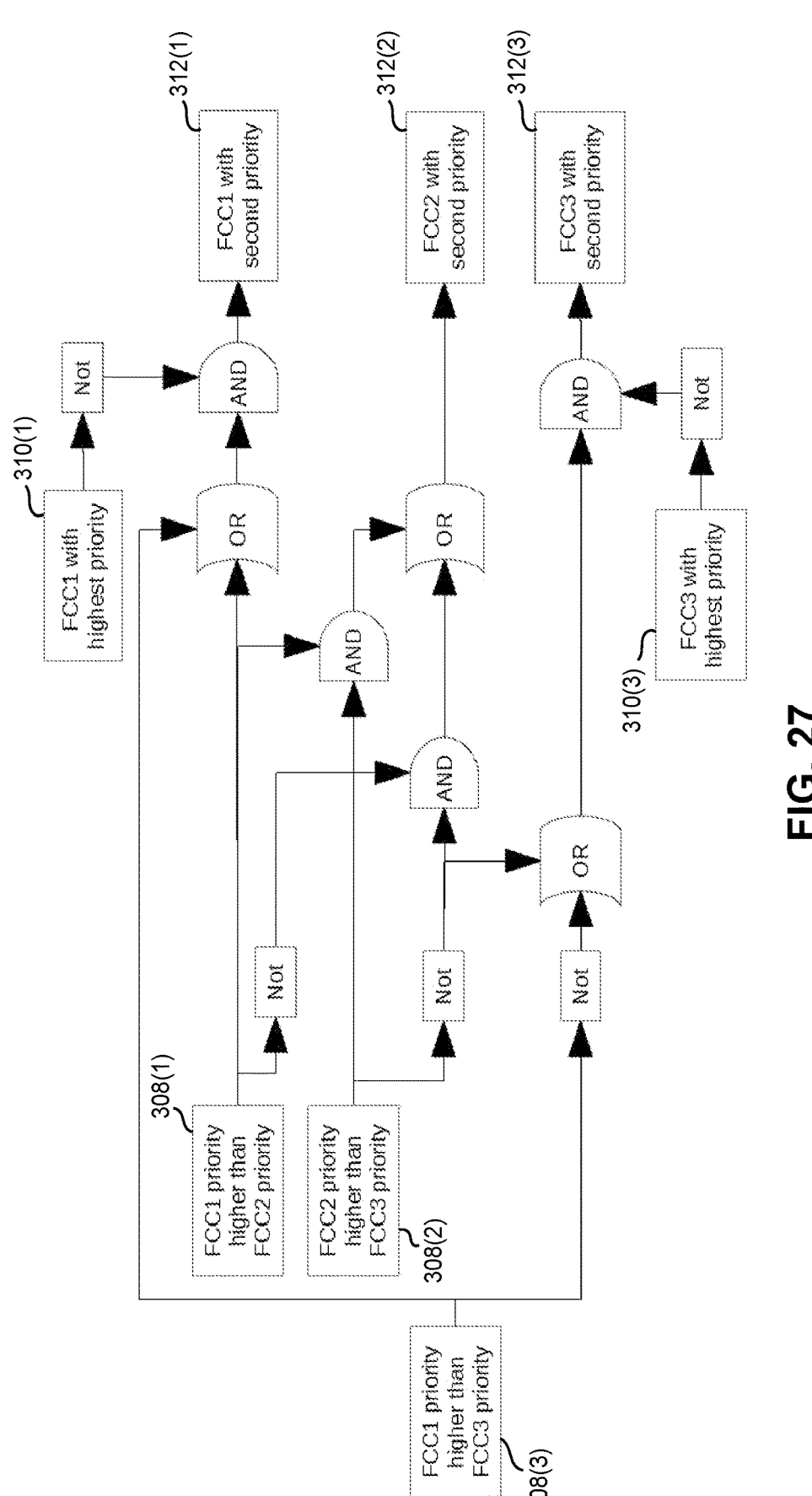
FIG. 27 shows another example of FCC output command selection/arbitration.

FIG. 27 shows a further example non-limiting logic diagram that determines second priorities 312. In this example, further logic circuitry added to the FIG. 26 logic circuitry uses additional NOT, AND and OR logic functions to determine which flight control computer capabilities have second priority. For example, if FCC1 with highest priority 310(1) is false, and FCC1 priority is higher than FCC3 priority or FCC1 priority is higher than FCC2 priority (308(3), 308(1)), then the FIG. 27 logic circuit determines that FCC1 has second priority 312(1). Similarly, if FCC2 priority higher than FCC3 priority is true and FCC1 priority higher than FCC2 priority is also true OR FCC1 priority higher than FCC2 priority is not true and FCC2 priority higher than FCC3 priority is also not true, then the FIG. 27 logic circuit determines that FCC2 has second priority 312(2). Similarly, if FCC3 with highest priority is not true and either FCC1 priority higher than FCC3 priority is not true or FCC2 priority higher than FCC3 priority is not true, then FCC3 is declared to have second priority 312(3).

Dual Lane Flight Control Computer

Figure 28:
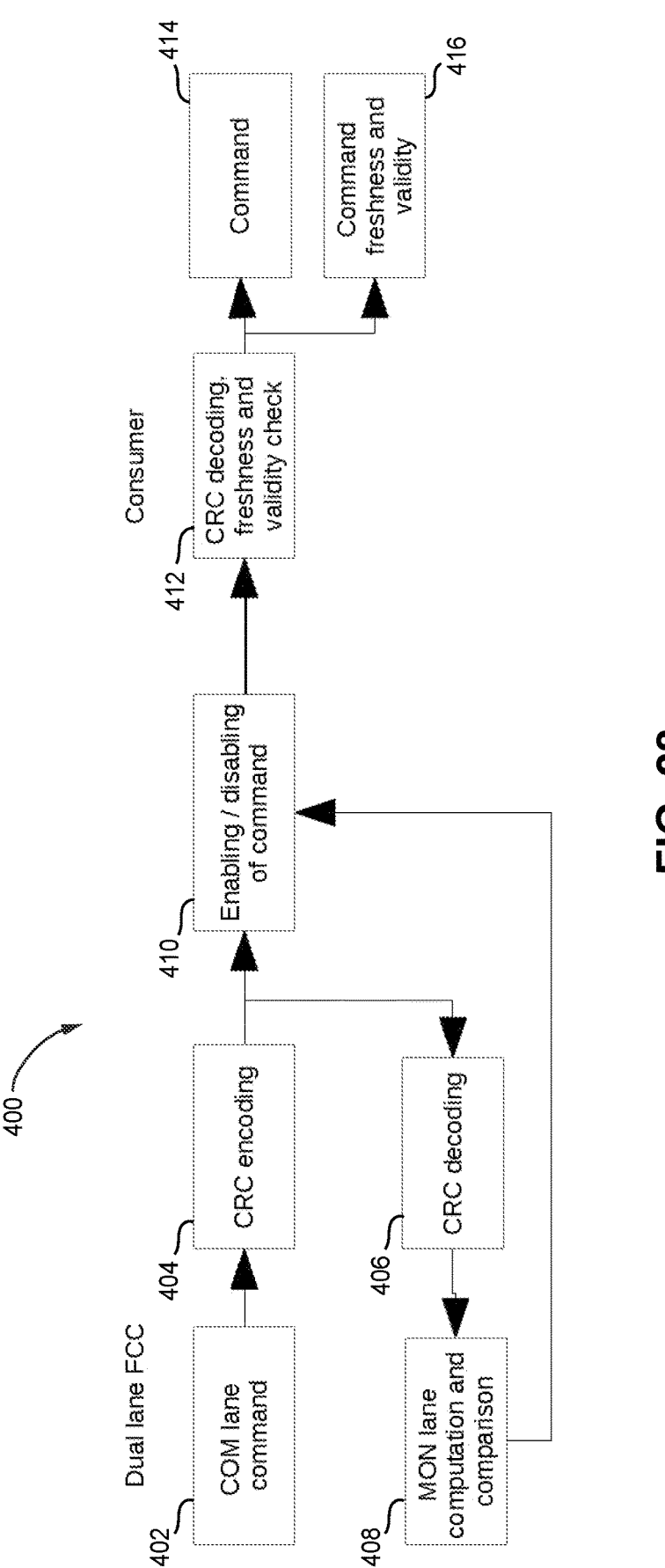
FIG. 28 shows an example of reliable communication of commands from a dual lane FCC to a consumer.

Dual lane flight control computers 202 are discussed above. FIG. 28 shows an example block diagram of a non-limiting dual lane flight control computer 400 architecture. In the example shown, a COM (command) lane command is generated (block 402) and is CRC-encoded (block 404) to protect the command from errors and transmission. The CRC-encoded command is provided to a further block for enabling/disabling the command (block 410). A feedback loop at the output of CRC-encoding block 404 decodes the encoded command (block 406), and a MON (monitor) lane computation and comparison 408 analyzes the command for effect and provides feedback input to the enabling/disabling block 410. If the monitor lane computation and comparison 408 detects that the command is harmful or otherwise should not be performed, block 410 can disable the command instead of sending it to a consumer such as an actuator for an effector. FIG. 28 further shows that at a consumer, a first block 412 decodes the command using the CRC and checks the command for freshness and validity. The freshness check may be performed in a variety of ways including, for example, by including sequence numbers and/or time stamps in each command. If the command is determined to be fresh and valid, then the command (block 414) may be passed along to an actuator for an effector. In addition, the block 412 may update a state in a memory or other store with respect to command freshness and validity (block 416) so that further received commands can be checked to ensure they are not out of sequence or out of time.

Figure 29:
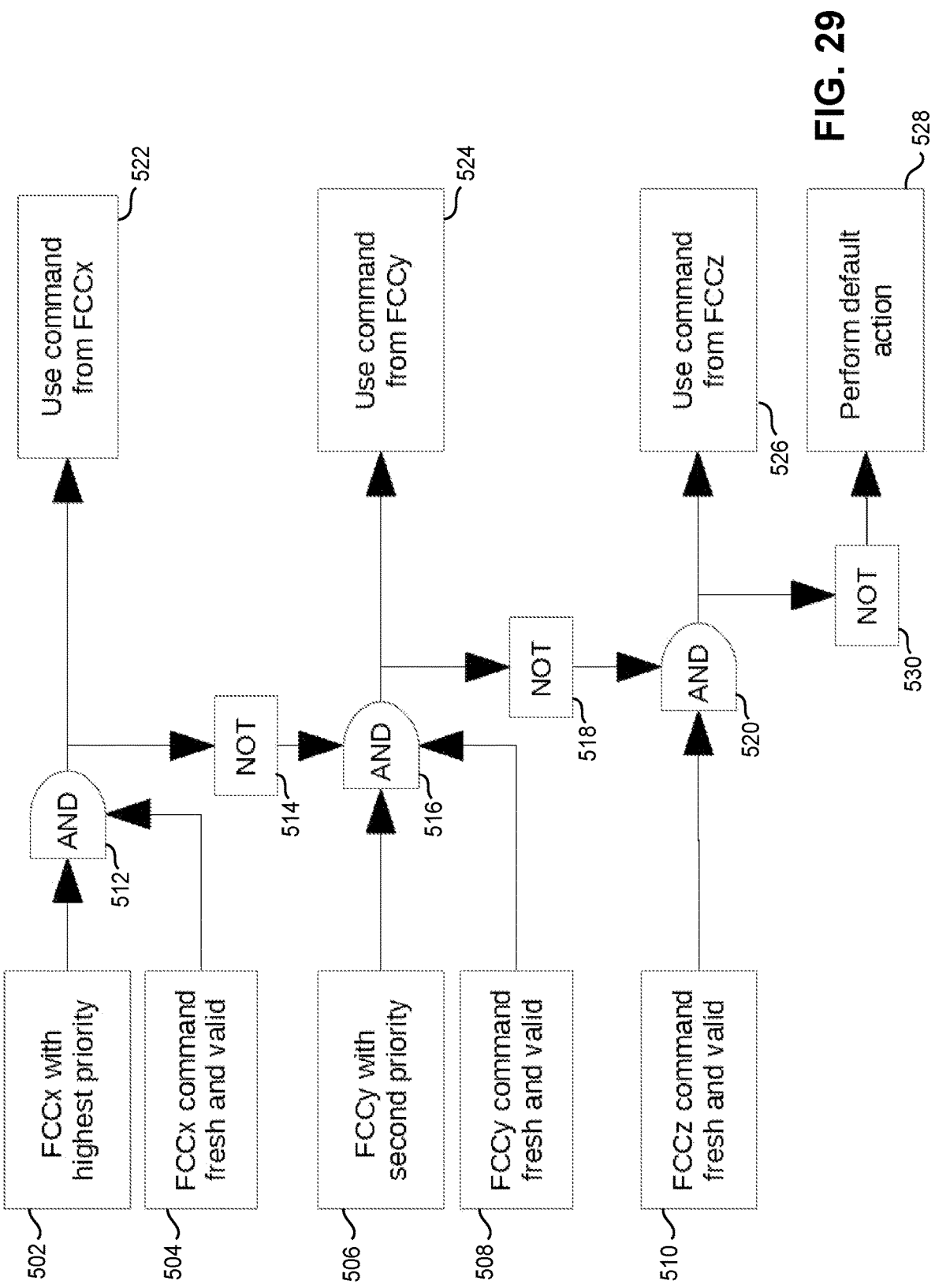
FIG. 29 shows another example of FCC output command selection/arbitration.

FIG. 29 is an additional block diagram showing an example non-limiting command processor that receives three commands from the FIG. 28 circuit: FCCx with highest priority (block 502), FCCy with second priority (block 506), and FCCz (which is the lowest priority). The FIG. 29 circuit also receives the confirmation in each case from the command freshness and validity state or store 416 of FIG. 28 indicating that the respective command is fresh and valid (block 504, 508, 510). FIG. 29 shows that if the FCCx command with highest priority is received and it is fresh and valid, AND decision 512 will determine to use that command (block 522). If, however, the above is false (as indicated by NOT inverter 514) AND the FCCy command with second priority is both received and is fresh and valid (as tested for by the AND gate 516), then the FCCy command will be used (block 524). Alternatively, if both of the above are not true (in this case, AND gates 512, 516, 520 are cascaded with respective inverters 514, 518 to provide essentially a NAND type circuit that produces a TRUE only when FCCx with highest priority and FCCx command fresh and valid is not true and FCCy with second priority and FCCy command fresh and valid is not true but the FCCz command fresh and valid is true, then the FIG. 29 circuit determines to use the fresh and valid command FCCz (block 526). Alternatively if the above is not true (as tested for by inverter 530) such that FCCz is not fresh and valid either, the FIG. 29 circuit does not use any of the inputs but instead performs a default action (block 528) which in some instances might be to do nothing.

Figure 30:
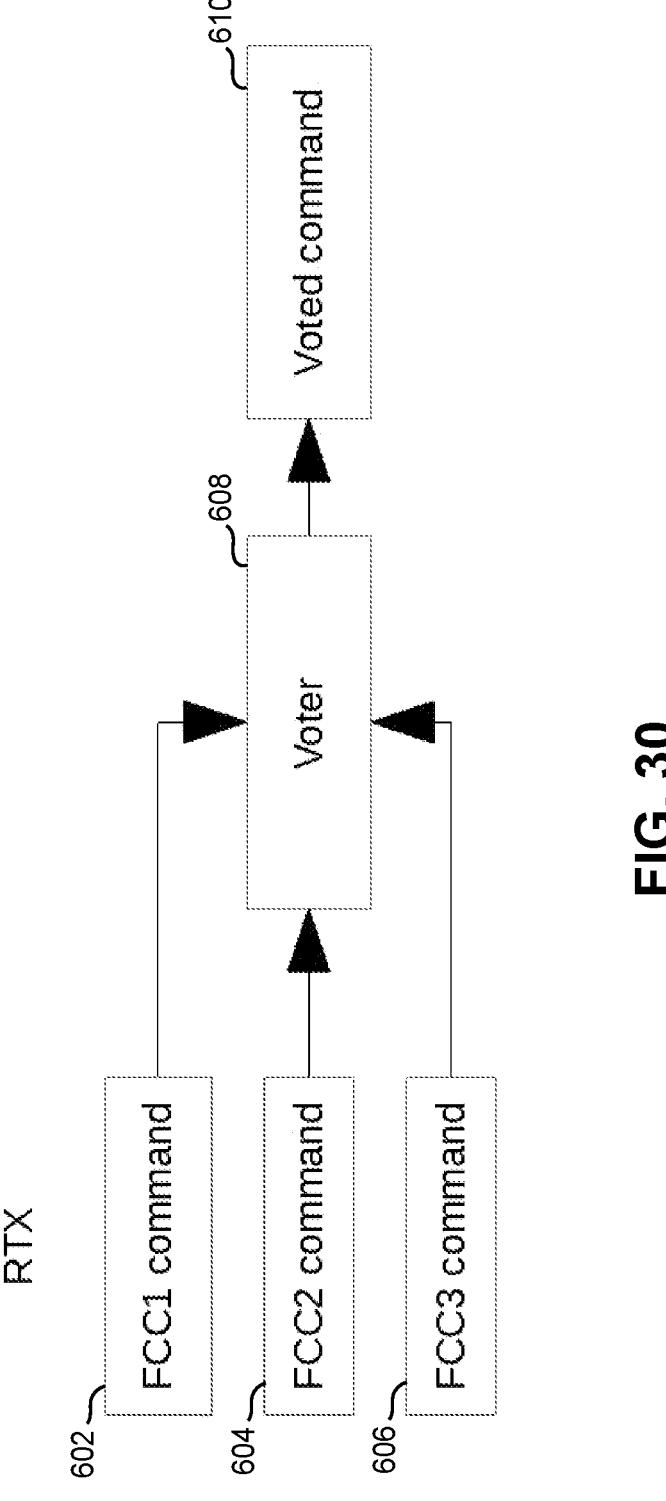
FIG. 30 shows an example of FCC output command voting/arbitration.

FIG. 30 shows an additional block diagram circuit including an RTX voter decision. In this case, an FCC1 command 602 and FCC2 command 604 and an FCC3 command 606 are voted on by a voter 608 and the "voted command" result of the voting 610 is used to control an actuator and/or effector. Voting may be performed based on a variety of different known voting functions that can be based on magnitude, duration, particular values, priorities, etc. as is well known to those skilled in the art.

Non-Limiting Description/Statement of Additional Combinations of Features of Various Embodiments 1. A first Flight Control system configuration, and the method to obtain such first configuration, having controllers of effector actuation means able to receive commands directly from at least three Flight Control Computers (FCCs).
    1.1. The configuration according to 1, wherein each of the three FCCs is directly linked to each of the controllers, being only one FCC active at a time.
        1.1.1. Each FCC of 1.1 having a command lane to send commands to the controllers and a monitor lane to check command integrity.
        1.1.2. Two of the three FCCs of 1.1 being of the same part number and one of the three FCCs being of a backup of dissimilar part number.
        1.1.3. Alternatively to 1.1.2, the three FCCs being of the same part number to reduce complexity of the solution.
        1.1.4. Each of the three FCCs of 1.1 being connected to some or to all of independent sensors located on the surfaces, propellers and or mechanisms of the effectors.
        1.1.5. Alternatively to 1.1.4, each of the three FCCs of 1.1 receiving sensor information from at least one Sensor interface module (SIM).
            1.1.5.1. Each sensor interface module having a single lane to read at least one of independent sensors located on the surfaces, propellers and or mechanisms of the effectors.
        1.1.6. At least one of the three FCCs of 1.1 receiving instructions from at least one Avionics computer
            1.1.6.1. The Avionics computer(s) of 1.1.6 being responsible to send high level instructions to the FCCs, including at least one of the following: navigation commands, Autonomous commands, commands from a remote controller, commands from a touch screen display.
        1.1.7. Alternatively or in conjunction with 1.1.6, each of the three FCCs of 1.1 being connected to flight deck inceptors.
            1.1.7.1. Where each FCC is directly connected to at least one sensor of each axis of control of flight deck inceptors.
            1.1.7.2. Alternatively or in conjunction with 1.1.7.1, each of the three FCCs of 1.1 receiving sensor information from at least one sensor interface module (SIM)
                1.1.7.2.1. Each sensor interface module having a single lane to read at least one sensor of each axis of control of the flight deck inceptors.
        1.1.8. Each FCC exchanging, with the other FCCs, part or all of its processed information and/or the information received from other components which include at least one of the following: the flight deck inceptors and/or effector sensors, as well as mode and state information, among other information, to allow data voting and mode coordination among the FCCs.
    1.2. The effector actuation means of 1.1 classified in: surface actuators, tilt mechanism actuators, and propeller electric motors.
        1.2.1. The controllers of surface actuators and tilt mechanisms of 1.2 having a single lane that receives the commands from the FCCs and executes the command from the active FCC if the command is considered fresh and valid by the actuator, otherwise switching to the second FCC with highest priority if fresh and valid, otherwise switching to the last FCC.
            1.2.1.1. The surface actuators and tilt mechanisms of 1.2 receiving each a link from the FCCs that enables or disables each actuator based on high integrity criteria implemented at the FCCs.
            1.2.1.2. Alternatively to 1.2.1.1, each surface actuator and tilt mechanism of 1.2 being energized/de-energized by a relay commanded by the FCCs.
        1.2.2. The controllers of propeller electric motors of 1.2 having a single lane that receives the commands from the FCCs and executes the command from the active FCC if the command is considered fresh and valid by the controller, otherwise switching to the second FCC with highest priority if fresh and valid, otherwise switching to the last FCC.
            1.2.2.1. The propeller electric motors controllers of 1.2 receiving each a link from the FCCs that enables or disables each motor based on criteria implemented at the FCCs.
            1.2.2.2. Alternatively to 1.2.2.1, each propeller electric motor controller of 1.2 being energized/de-energized by a contactor commanded by the FCCs.
        1.2.3. Alternatively to 1.2.2, the controllers of propeller electric motors of 1.2 having a control lane and a monitor lane that receive the commands from the FCCs and execute the command from the active FCC if the command is considered fresh and valid by the controller, otherwise switching to the second FCC with highest priority if fresh and valid, otherwise switching to the last FCC.

2. A second Flight Control system configuration, and the method to obtain such second configuration, having retransmitters (RTX) that receive commands from the three FCCs and then retransmit to the controllers of effector actuation means.

2.1. Where the term RTX may refer to many different types of units depending on which function they perform such as voting, source selection, etc. Some examples are Remote Electronic Unit (REU), Remote Data Concentrator (RDC), Inceptor Inter-face Module (IIM), Input Output Module (IOM), etc.

2.1.1. Where at least one RTX receive commands from each of the three FCCs.

2.1.1.1. Where at least one RTX receives the commands from the FCCs and retransmits the command from the active FCC if the command is considered fresh and valid by the actuator, otherwise switching to the second FCC with highest priority if fresh and valid, otherwise switching to the last FCC.

2.1.1.2. Alternatively to or in conjunction with 2.1.1.1, at least one RTX receives the com-mands from the three FCCs and retransmits all of them.

2.1.1.3. Alternatively to or in conjunction with 2.1.1.1 and/or 2.1.1.2, at least one RTX receive commands from each of the three FCCs and vote the commands for retransmitting a voted value.

2.1.2. Alternatively, some of the RTXs are also FCCs, reducing the number of LRUs.

2.2. The configuration according to 2, wherein each of the three FCCs is indirectly linked to each of the controller of effector actuation means.

2.2.1. At least one FCC of 2.2 having a command lane to process and send commands to the con-trollers and a monitor lane to check command integrity.

2.2.2. Alternatively to or in conjunction with 2.2.1, at least one FCC of 2.2 having a single lane to process and send commands to the controllers.

2.2.3. Each of the three FCCs of 2.2 being of dissimilar part numbers.

2.2.4. Alternatively to 2.2.3, the three FCCs being of the same part number to reduce complexity of the solution.

2.2.5. Each of the three FCCs of 2.2 being connected to some or to all of independent sensors located on the surfaces, propellers and or mechanisms of the effectors.

2.2.6. Alternatively to or in conjunction with 2.2.5, each of the three FCCs of 2.2 receiving sensor information from at least one Sensor interface module (SIM).

2.2.6.1. Each sensor interface module having a single lane to read at least one of independent sensors located on the surfaces, propellers and or mechanisms of the effectors.

2.2.7. At least one of the three FCCs of 2.2 receiving instructions from at least one Avionics computer 2.2.7.1. The Avionics computer(s) of 1.1.6 being responsible to send high level instructions to the FCCs, including at least one of the following: navigation commands, Autonomous com-mands, commands from a remote controller, commands from a touch screen display.

2.2.8. Alternatively or in conjunction with 2.2.7, each of the three FCCs of 2.2 being connected to flight deck inceptors.

2.2.8.1. Where each FCC is directly connected to at least one sensor of each axis of control of flight deck inceptors.

2.2.8.2. Alternatively or in conjunction with 2.2.8.1, each of the three FCCs of 2.2 receiving sensor information from at least one sensor interface module (SIM)

2.2.8.2.1. Each sensor interface module having a single lane to read at least one sensor of each axis of control of the flight deck inceptors.

2.2.9. Each FCC exchanging, with the other FCCs, part or all of its processed information and/or the information received from other components which include at least one of the following: the flight deck inceptors and/or effector sensors, as well as mode and state information, among other information, to allow data voting and mode coor-dination among the FCCs.

2.3. At the configuration of 2, each controller of effector actuation mean receives command from at least two RTXs.

2.3.1. The controllers of surface actuators and tilt mechanisms of 2.3 having a single lane that receives the commands from the RTXs and executes the source with highest priority if the command is considered fresh and valid by the controller, otherwise switching to the other(s) source(s) with highest priority if fresh and valid.

2.3.1.1. The surface actuators and tilt mechanisms of 2.3 receiving at least a link from the RTXs that enables or disables each controller based on high integrity criteria implemented at the RTXs.

2.3.1.2. Alternatively or in conjunction with 2.3.1.1, the surface actuators and tilt mecha-nisms of 2.3 receiving at least a link from the FCCs that enables or disables each controller based on high integrity criteria implemented at the FCCs.

2.3.1.3. Alternatively or in conjunction with 2.3.1.1 and 2.3.1.2, each surface actuator and tilt mechanism of 2.3 being energized/de-ener-gized by a relay commanded by the RTXs.

2.3.2. The controllers of propeller electric motors of 2.3 having a single lane that receives the com-mands from the RTXs and executes the command from the source with highest priority if the com-mand is considered fresh and valid by the con-troller, otherwise switching to the other(s) source (s) with highest priority if fresh and valid.

2.3.2.1. The propeller electric motors controllers of 2.3 receiving at least a link from the RTXs that enables or disables each motor based on criteria implemented at the RTXs.

2.3.2.2. Alternatively or in conjunction with 2.3.2.1, the controllers of propeller electric motors of 2.3 receiving at least a link from the FCCs that enables or disables each controller based on high integrity criteria implemented at the FCCs.

2.3.2.3. Alternatively or in conjunction with 2.3.2.1 and 2.3.2.2, each propeller electric motor controller of 2.3 being energized/de-en-ergized by a contactor commanded by the RTXs.

2.3.3. Alternatively to or in conjunction with 2.3.2, 2.3.2.1, 2.3.2.2, the controllers of propeller electric motors of 2.3 having a control lane and a monitor lane that receive the commands and execute the command with highest priority if the command is considered fresh and valid by the controller, otherwise switching to the other(s) source(s) with highest priority if fresh and valid.

2.4. The method to obtain the architecture with the minimum number of RTXs of 2 is determined using either the theory of complete graphs or bipartite graphs depending on whether one or more types of RTXs are used in the architecture.

2.4.1. The minimum number of RTXs of 2, if all RTXs are all of the same type, is determined by the theory of complete graphs.

2.4.2. The minimum number of RTXs of 2, if two different types of RTXs are used, is determined by the theory of bipartite graphs.

2.4.3. In the configuration of 2.4.1, the architecture with minimum number of RTXs is determined by the maximum number of controllers of the same category.

2.4.3.1. The controllers of 2.4.3 may be grouped in categories which may be, for example, the category of surface actuators, the category of motor controllers, or any other meaningful category.

2.4.3.2. At 2.4.3, if E is the maximum number of controllers of the category with greater number of elements, then, if n is the minimum number of RTXs, according to the theory of complete graphs, it can be determined by finding the value of n that results in the minimum value of K such that K is greater or equal to E, where $K=n*(n-1)/2$.

2.4.4. In the configuration of 2.4.2, the architecture with minimum number of RTXs is also determined by the maximum number of controllers of the same category.

2.4.4.1. At 2.4.4, if E is the maximum number of controllers of the category with greater number of elements, then, if m is the minimum number of RTXs of a first type and n is the minimum number of RTXs of a second type, according to the theory of bipartite graphs, the values of m and n can be determined by finding any combination in which the values of m and n result in the minimum value of K such that K is greater than or equal to E, where it is given by $K_{m,n}=m*n$. In this case, more than one solution is possible and therefore it can be used more or less RTXs of a first type depending on the number of RTXs of the second type.

3. A third Flight Control system configuration, and the method to obtain such third configuration, is a hybrid configuration.

3.1. In the hybrid configuration of 3, the controllers of propeller electric motors receive commands directly from at least three Flight Control Computers (FCCs).

3.1.1. The configuration according to 3.1, wherein each of the three FCCs is directly linked to at least one of the controllers of propeller electric motors, being only one FCC active at a time.

3.1.1.1. All the sub-items of 1.1 are similarly applicable to 3.1.1, but are not repeated here for simplicity.

3.1.1.2. The controller(s) of propeller electric motor(s) of 3.1.1 having a single lane that receives the commands from the FCCs and executes the command from the active FCC if the command is considered fresh and valid by the actuator, otherwise switching to the second FCC with highest priority if fresh and valid, otherwise switching to the last FCC.

3.1.1.2.1. The controller(s) of propeller electric motor(s) of 3.1.1.2 receiving each a link from the FCCs that enables or disables each motor based on criteria implemented at the FCCs.

3.1.1.2.2. Alternatively to 3.1.1.2.1, each propeller electric motor controller of 3.1.1.2 being energized/de-energized by a contactor commanded by the FCCs.

3.1.1.3. Alternatively to 3.1.1.2, the controller(s) of propeller electric motor(s) of 3.1.1 having 3.1.1.3.1. a control lane that receive the commands from the FCCs and execute the command from the active FCC if the command is considered fresh and valid by the controller, otherwise switching to the second FCC with highest priority if fresh and valid, otherwise switching to the last FCC.

3.1.1.3.2. a monitor lane that forces safe state of the respective controller of propeller electric motor in case of misbehavior of the control lane.

3.2. The hybrid configuration of 3 having retransmitters (RTX) that receive commands from the three FCCs and then retransmit to the remaining controllers of effector actuation means not mentioned at 3.1.

3.2.1. At the configuration of 3.2, each remaining controller receives command from at least two RTXs.

3.2.2. The method to obtain the architecture with the minimum number of RTXs of 3.2 is determined using either the theory of complete graphs or bipartite graphs depending on whether one or more types of RTXs are used in the architecture.

3.2.2.1. All the sub-items of 2.4 are similarly applicable to 3.2.2, but are not repeated here for simplicity.

3.2.3. Alternatively, some of the RTXs are also FCCs, reducing the number of LRUs.

A further non-limiting aspect may provide a first Flight Control system comprising:

at least three Flight Control Computers (FCCs); and controllers of effector actuators configured to receive commands directly from the at least three FCCs.

In this system, each of the three FCCs is directly linked to each of the controllers, being only one FCC active at a time to control the controllers.

In this system, the FCCs each comprise a command lane to send commands to the controllers and a monitor lane to check command integrity.

In this system, plural of the at least three FCCs are of the same part number and one of the at least three FCCs is a backup and has a dissimilar part number.

In this system, the at least three FCCs are of the same part number to reduce complexity.

In this system, each of the at least three FCCs is connected to some or to all of independent sensors located on surfaces, propellers and or mechanisms of effectors; or each of the at least three FCCs is configured to receive sensor information from at least one Sensor interface module (SIM); or the at least one sensor interface module comprises a single lane configured to read at least one of independent sensors located on surfaces, propellers and/or mechanisms of effectors.

In this system, at least one of the at least three FCCs is configured to receive instructions from at least one Avionics computer.

In this system, the at least one Avionics computer is configured to be responsible to send high level instructions to the FCCs, including at least one of the following: navigation commands, Autonomous commands, commands from a remote controller, and commands from a touch screen display.

In this system, each of the at least three FCCs is connected to flight deck inceptors.

In this system, each FCC is directly connected to at least one sensor of each axis of control of the flight deck inceptors.

In this system, each of the at least three FCCs are configured to receive sensor information from at least one sensor interface module (SIM).

In this system, the sensor interface module comprises a single lane to read at least one sensor of each axis of control of the flight deck inceptors.

In this system, each FCC is configured to exchange, with the other FCCs, part or all of processed information and/or the information received from other components which include at least one of the following: flight deck inceptors and/or effector sensors, as well as mode and state information, among other information, to allow data voting and mode coordination among the FCCs.

In this system, the effector actuator is classified in: surface actuators, tilt mechanism actuators, and propeller electric motors.

In this system, a controller of the surface actuators and tilt mechanisms comprise a single lane that receives the commands from the FCCs and executes the command from the active FCC if the command is considered fresh and valid by the actuator, and otherwise switches to a second FCC with highest priority if fresh and valid, and otherwise switches to a last FCC.

In this system, the surface actuators and tilt mechanisms are configured to each receive a link from the FCCs that enables or disables each actuator based on high integrity criteria implemented at the FCCs.

In this system, each surface actuator and tilt mechanism is configured to be energized/de-energized by a relay commanded by the FCCs.

This system may further include controllers of propeller electric motors comprising a single lane that receives the commands from the FCCs and executes the command from an active FCC if the command is considered fresh and valid by the controller, otherwise switching to a second FCC a highest priority if fresh and valid, and otherwise switching to a last FCC.

In this system, the controllers of propeller electric motors are configured to each receive a link from the FCCs that enables or disables each propeller electric motor based on high integrity criteria implemented at the FCCs.

In this system, each controller of propeller electric motor is configured to be energized/de-energized by a contactor commanded by the FCCs.

In another non-limiting aspect, a second Flight Control system may comprise:

at least three Flight Control Computers (FCCs); and
retransmitters (RTX); and controllers of effector actuators configured to receive commands from the at least one retransmitter.

In this system, at least on RTX receive commands from each of the three FCCs, being only one FCC active at a time to control the controllers.

In this system, the FCCs each comprise a command lane to send commands to the controllers and a monitor lane to check command integrity.

In this system, plural of the at least three FCCs are of the same part number and one of the at least three FCCs is a backup and has a dissimilar part number.

In this system, the at least three FCCs are of the same part number to reduce complexity.

In this system, each of the at least three FCCs is connected to some or to all of independent sensors located on surfaces, propellers and or mechanisms of effectors.

In this system, each of the at least three FCCs is configured to receive sensor information from at least one Sensor interface module (SIM); or the at least one sensor interface module comprises a single lane configured to read at least one of independent sensors located on surfaces, propellers and/or mechanisms of effectors; or at least one of the at least three FCCs is configured to receive instructions from at least one Avionics computer.

In this system, the at least one Avionics computer is configured to be responsible to send high level instructions to the FCCs, including at least one of the following: navigation commands, Autonomous commands, commands from a remote controller, and commands from a touch screen display.

In this system, each of the at least three FCCs is connected to flight deck inceptors.

In this system, each FCC is directly connected to at least one sensor of each axis of control of the flight deck inceptors.

In this system, each of the at least three FCCs are configured to receive sensor information from at least one sensor interface module (SIM).

In this system, the sensor interface module comprises a single lane to read at least one sensor of each axis of control of the flight deck inceptors.

In this system, each FCC is configured to exchange, with the other FCCs, part or all of processed information and/or the information received from other components which include at least one of the following: flight deck inceptors and/or effector sensors, as well as mode and state information, among other information, to allow data voting and mode coordination among the FCCs.

In this system, the effector actuator is classified in: surface actuators, tilt mechanism actuators, and propeller electric motors.

In this system, a controller of the surface actuators and tilt mechanisms comprise a single lane that receives the commands from at least two RTXs and executes the command from the source with highest priority if the command is considered fresh and valid by the controller, otherwise switching to the other(s) source(s) with highest priority if fresh and valid.

In this system, the surface actuators and tilt mechanisms are configured to each receive a link from the RTXs that enables or disables each actuator based on high integrity criteria implemented at the RTXs.

In this system, each surface actuator and tilt mechanism is configured to be energized/de-energized by a relay commanded by the RTXs.

This system may further include controllers of propeller electric motors comprising a single lane that receives the commands from at least two RTXs and executes the command the source with highest priority if the command is considered fresh and valid by the controller, otherwise switching to the other(s) source(s) with highest priority if fresh and valid.

In this system, the controllers of propeller electric motors are configured to each receive a link from the RTXs that enables or disables each propeller electric motor based on high integrity criteria implemented at the FCCs.

In this system, each controller of propeller electric motor is configured to be energized/de-energized by a contactor commanded by the RTXs.

In this system, the method to obtain the architecture with the minimum number of RTXs is determined using either the theory of complete graphs or bipartite graphs.

In this system, the minimum number of RTXs, if all RTXs are all of the same type, is determined by the theory of complete graphs.

In this system, the minimum number of RTXs, if two different types of RTXs are used, is determined by the theory of bipartite graphs.

In this system, the architecture with minimum number of RTXs is determined by the maximum number of controllers of the same category.

In this system, if E is the maximum number of controllers of the category with greater number of elements, if n is the minimum number of RTXs, according to the theory of complete graphs, the value of n that results by finding the minimum value of K such that K is greater than or equal to E, where $K=n*(n-1)/2$.

In this system, the architecture with minimum number of RTXs is determined by the maximum number of controllers of the same category.

In this system, if E is the maximum number of controllers of the category with greater number of elements, if m is the minimum number of RTXs of a first type and n is the minimum number of RTXs of a second type, according to the theory of bipartite graphs, the values of m and n is determined by finding any combination in which the values of m and n result in the minimum value of K such that K is greater than or equal to E, where it is given by $Km,n=m*n$.

In another non-limiting aspect, a third Flight Control system may comprise:

at least three Flight Control Computers (FCCs); and retransmitters (RTX); and
controllers of effector actuators.

In this system, at least on RTX receive commands from each of the three FCCs, being only one FCC active at a time to control the controllers.

In this system, the FCCs each comprise a command lane to send commands to the controllers and a monitor lane to check command integrity.

In this system, plural of the at least three FCCs are of the same part number and one of the at least three FCCs is a backup and has a dissimilar part number.

In this system, the at least three FCCs are of the same part number to reduce complexity.

In this system, each of the at least three FCCs is connected to some or to all of independent sensors located on surfaces, propellers and or mechanisms of effectors; or each of the at least three FCCs is configured to receive sensor information from at least one Sensor interface module (SIM); or the at least one sensor interface module comprises a single lane configured to read at least one of independent sensors located on surfaces, propellers and/or mechanisms of effectors.

In this system, at least one of the at least three FCCs is configured to receive instructions from at least one Avionics computer.

In this system, the at least one Avionics computer is configured to be responsible to send high level instructions to the FCCs, including at least one of the following: navigation commands, Autonomous commands, commands from a remote controller, and commands from a touch screen display.

In this system, each of the at least three FCCs is connected to flight deck inceptors.

In this system, each FCC is directly connected to at least one sensor of each axis of control of the flight deck inceptors.

In this system, each of the at least three FCCs are configured to receive sensor information from at least one sensor interface module (SIM).

In this system, the sensor interface module comprises a single lane to read at least one sensor of each axis of control of the flight deck inceptors.

In this system, each FCC is configured to exchange, with the other FCCs, part or all of processed information and/or the information received from other components which include at least one of the following: flight deck inceptors and/or effector sensors, as well as mode and state information, among other information, to allow data voting and mode coordination among the FCCs.

In this system, the effector actuator is classified in: surface actuators, tilt mechanism actuators, and propeller electric motors.

In this system, a controller of the surface actuators and tilt mechanisms comprise a single lane that receives the commands from at least two RTXs and executes the command from the source with highest priority if the command is considered fresh and valid by the controller, otherwise switching to the other(s) source(s) with highest priority if fresh and valid.

In this system, the surface actuators and tilt mechanisms are configured to each receive a link from the RTXs that enables or disables each actuator based on high integrity criteria implemented at the RTXs.

In this system, each surface actuator and tilt mechanism is configured to be energized/de-energized by a relay commanded by the RTXs.

This system may further include controllers of propeller electric motors comprising a single lane that receives the commands from the FCCs and executes the command from an active FCC if the command is considered fresh and valid by the controller, otherwise switching to a second FCC a highest priority if fresh and valid, and otherwise switching to a last FCC.

In this system, the controllers of propeller electric motors are configured to each receive a link from the FCCs that enables or disables each propeller electric motor based on high integrity criteria implemented at the FCCs.

In this system, each controller of propeller electric motor is configured to be energized/de-energized by a contactor commanded by the FCCs.

In this system, the method to obtain the architecture with the minimum number of RTXs is determined using either the theory of complete graphs or bipartite graphs.

In this system, the minimum number of RTXs, if all RTXs are all of the same type, is determined by the theory of complete graphs.

In this system, the minimum number of RTXs, if two different types of RTXs are used, is determined by the theory of bipartite graphs.

In this system, the architecture with minimum number of RTXs is determined by the maximum number of controllers of surface actuators and tilt mechanisms of the same category.

In this system, if E is the maximum number of controllers of the category with greater number of elements, if n is the minimum number of RTXs, according to the theory of complete graphs, the value of n that results by finding the minimum value of K such that K is greater than or equal to E, where $K=n*(n-1)/2$.

In this system, the architecture with minimum number of RTXs is determined by the maximum number of controllers of surface actuators and tilt mechanisms of the same category.

In this system, if E is the maximum number of controllers of the category with greater number of elements, if m is the minimum number of RTXs of a first type and n is the minimum number of RTXs of a second type, according to the theory of bipartite graphs, the values of m and n is determined by finding any combination in which the values of m and n result in the minimum value of K such that K is greater than or equal to E, where it is given by $Km,n=m*n$.

All patents, patent applications and publications cited herein are incorporated by reference for all purposes as if expressly set forth.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A Flight Control system configured so that a majority of effectors continue to be operational even in case of loss of a majority of flight control computers, comprising:
   a first Flight Control Computer (FCC);
   a second Flight Control Computer (FCC);
   a third Flight Control Computer (FCC); and
   communications links that link the first, second and third Flight Control Computers to a controller of an effector actuator to enable the controller to receive commands from the first, second and third FCCs either directly or through a number of retransmitters (RTXs),
   wherein each of the first, second and third FCCs is linked to the controller, and the FCCs and/or the communications links are configured so only one FCC is active at a time to control the controller,
   wherein the number of retransmitters is determined using complete or bipartite graphs, wherein, where E is a maximum number of controllers, and n is the minimum number of retransmitters, a value of n results by finding the minimum value of K such that K is greater than or equal to E, where $K=n*(n-1)/2$; or where m is the minimum number of RTXs of a first type and n is the minimum number of RTXs of a second type, values of m and n are determined by finding any combination in which the values of m and n result in the minimum value of K such that K is greater than or equal to E, where it is given by $Km,n=m*n$.

2. The system of claim 1 further comprising second and third controllers of respective second and third effector actuators, the second and third controllers are enabled to receive commands from the first, second and third FCCs either directly or through retransmitters.

3. The system of claim 1 wherein the first, second and third FCCs each comprise a command lane to send commands to the controller and a monitor lane to check command integrity.

4. The system of claim 1 wherein each of the first, second and third FCCs is connected to sensors located on surfaces, propellers and/or mechanisms of effectors; or each of the first, second and third FCCs is configured to receive sensor information from at least one Sensor interface module (SIM); or the system comprises at least one single lane sensor interface configured to read at least one independent sensor located on surfaces, propellers and/or mechanisms of effectors.

5. The system of claim 1 further comprising at least one avionics computer configured to send high level instructions to the FCCs, including navigation commands, autonomous commands, commands from a remote controller, and commands from a touch screen display.

6. The system of claim 1 wherein each of the first, second and third FCCs is directly connected to at least one sensor of each axis of control of at least one flight deck inceptor.

7. The system of claim 1 wherein each FCC is configured to exchange, with the other FCCs, part or all of processed information and/or the information received from flight deck inceptors and/or effector sensors, including mode and state information, to enable data voting and mode coordination among the FCCs.

8. The system of claim 1 wherein the controller comprises a single lane that receives commands from the first, second and third FCCs and executes a command from an active one of the first, second and third FCCs if the command is considered fresh and valid, and otherwise switches to executing a command from a different one of the first, second and third FCCs with highest priority if a command sent thereby is considered fresh and valid, and otherwise switches to executing a command from a still different one of the first, second and third FCCs.

9. The system of claim 1 wherein the controller is configured to receive a link from the first, second and third FCCs that selectively enables an actuator based on high integrity criteria implemented at the first, second and third FCCs.

10. The system of claim 1 wherein the controller is configured to be energized/de-energized by a relay commanded by the FCCs.

11. The system of claim 1 wherein the controller controls a propulsor electric motor; or the controller controls a surface actuator; or the controller controls a tilt mechanism.

12. The system of claim 1 wherein the communications links are configured to link the first, second and third Flight Control Computers to a controller of a first effector actuator to enable the controller of the first effector actuator to receive commands from the first, second and third FCCs directly, and to link the first, second and third Flight Control Computers to a controller of a further effector actuator to enable the controller of the further effector actuator to receive commands from the first, second and third FCCs indirectly through the number of retransmitters.

13. A Flight Control method configured so a majority of effectors continue to be operational even in case of loss of a majority of flight control computers, comprising:
   linking a first Flight Control Computer (FCC), a second Flight Control Computer (FCC) and a third Flight Control Computer (FCC) to a controller of an effector actuator to enable the controller to receive commands from the first, second and third FCCs either directly or through a number of retransmitters (RTXs), effecting, with the controller, control by only one active FCC at a time, and determining the number of retransmitters using complete or bipartite graphs, wherein, where E is the maximum number of controllers s, and n is the minimum number of retransmitters, a value of n results by finding the minimum value of K such that K is greater than or equal to E, where $K=n*(n-1)/2$; or where m is the minimum number of RTXs of a first type and n is the minimum number of RTXs of a second type, values of m and n are determined by finding any combination in which the values of m and n result in the minimum value of K such that K is greater than or equal to E, where it is given by $Km,n=m*n$.

14. The method of claim 13 wherein the FCCs each comprise a command lane sending commands to the controller and a monitor lane checking command integrity.

15. The method of claim 13 wherein each of the first, second and third FCCs is connected to sensors located on surfaces, propellers and/or mechanisms of effectors; or each of the first, second and third FCCs receives sensor information from at least one Sensor interface module (SIM); or at least one single lane sensor interface reads at least one independent sensor located on surfaces, propellers and/or mechanisms of effectors.

16. The method of claim 13 further comprising sending, with at least one avionics computer, high level instructions to the FCCs, including navigation commands, autonomous commands, commands from a remote controller, and commands from a touch screen display.

17. The method of claim 13 wherein each of the first, second and third FCCs is directly connected to at least one sensor of each axis of control of at least one flight deck inceptor.

18. The method of claim 13 further including with each FCC, exchanging with the other FCCs, part or all of processed information and/or the information received from flight deck inceptors and/or effector sensors, including mode and state information, and performing data voting and mode coordination among the FCCs.

19. The method of claim 13 further comprising receiving, with a single lane, commands from the first, second and third FCCs and executing, with the controller, a command from an active one of the first, second and third FCCs if the command is considered fresh and valid, and otherwise switching to execute a command from a different one of the first, second and third FCCs with highest priority if a command sent thereby is considered fresh and valid, and otherwise switching to execute a command from a still different one of the first, second and third FCCs.

20. The method of claim 13 further comprising receiving, with the controller, a link from the first, second and third FCCs that selectively enables an actuator based on high integrity criteria implemented at the first, second and third FCCs.

21. The method of claim 13 further comprising energizing/de-energizing a relay commanded by the FCCs.

22. The method of claim 13 further comprising controlling, with the controller, a propulsor electric motor of a VTOL or a surface actuator; or a tilt mechanism.

23. The method of claim 13 wherein linking comprises linking the first Flight Control Computer (FCC), the second Flight Control Computer (FCC) and the third Flight Control Computer (FCC) to the controller of a first effector actuator to enable the controller of the first effector actuator to receive commands directly from the first, second and third FCCs, and linking the first Flight Control Computer (FCC), the second Flight Control Computer (FCC) and the third Flight Control Computer (FCC) to the controller of a further effector actuator to enable the controller of the further effector actuator to receive commands from the first, second and third FCCs indirectly through the number of retransmitters.

* * * * *